US012576597B2

(12) United States Patent
Gozu et al.

(10) Patent No.: US 12,576,597 B2
(45) Date of Patent: Mar. 17, 2026

(54) ATTITUDE ADJUSTMENT METHOD

(71) Applicant: SEIKO EPSON CORPORATION, Tokyo (JP)

(72) Inventors: Masayuki Gozu, Ina (JP); Tatsuya Teramoto, Shiojiri (JP); Kota Noguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/814,729

(22) Filed: Aug. 26, 2024

(65) Prior Publication Data

US 2025/0074004 A1 Mar. 6, 2025

(30) Foreign Application Priority Data

Aug. 29, 2023 (JP) ................................. 2023-138813

(51) Int. Cl.
| | |
|---|---|
| *B29C 64/393* | (2017.01) |
| *B29C 64/295* | (2017.01) |
| *B33Y 30/00* | (2015.01) |
| *B33Y 50/02* | (2015.01) |
| *B29C 64/118* | (2017.01) |
| *B29C 64/209* | (2017.01) |
| *B29K 55/02* | (2006.01) |
| *B33Y 10/00* | (2015.01) |

(52) U.S. Cl.
CPC .......... *B29C 64/393* (2017.08); *B29C 64/295* (2017.08); *B33Y 30/00* (2014.12); *B33Y 50/02* (2014.12); *B29C 64/118* (2017.08); *B29C 64/209* (2017.08); *B29K 2055/02* (2013.01); *B33Y 10/00* (2014.12)

(58) Field of Classification Search
CPC ............................ B29C 64/295; B29C 64/393
See application file for complete search history.

(56) References Cited

U.S. PATENT DOCUMENTS

| | | | |
|---|---|---|---|
| 2021/0146601 A1* | 5/2021 | Cao .................... | B23K 26/0643 |
| 2022/0355544 A1 | 11/2022 | Abe et al. | |
| 2024/0326332 A1* | 10/2024 | Sameshima ........... | B29C 64/209 |

FOREIGN PATENT DOCUMENTS

JP 2022-170965 A 11/2022

* cited by examiner

*Primary Examiner* — Alison L Hindenlang
*Assistant Examiner* — Alexander A Wang
(74) *Attorney, Agent, or Firm* — WORKMAN NYDEGGER

(57) ABSTRACT

An attitude adjustment method includes (a) fixing an attitude of a first heating unit by an attitude changing portion with a heating surface and a modeling surface or a jig provided in parallel to the modeling surface in contact in a first planar position, (b) measuring flatness of the heating surface by a planar sensor for measuring the flatness of the heating surface, (c) determining a second planar position where the heating surface and the modeling surface are brought into contact based on the measured flatness, and (d) bringing the heating surface and the modeling surface or the jig provided in parallel to the modeling surface into contact and fixing the attitude of the first heating unit by the attitude changing portion in the determined second planar position with a change of the attitude by the attitude changing portion allowed.

6 Claims, 17 Drawing Sheets

ATTITUDE ADJUSTMENT METHOD

The present application is based on, and claims priority from JP Application Serial Number 2023-138813, filed Aug. 29, 2023, the disclosure of which is hereby incorporated by reference herein in its entirety.

BACKGROUND

1. Technical Field

The present disclosure relates to an attitude adjustment method.

2. Related Art

JP-A-2022-170965 discloses a three-dimensional modeling apparatus including a plate-shaped heating unit that is positioned above a stage on which a three-dimensional modeled object is to be modeled and heats a modeling material on the stage. JP-A-2022-170965 is an example of the related art.

In order to improve the modeling accuracy of the three-dimensional modeled object, it is preferable to uniformly heat the modeling material on the stage. Therefore, there is a demand for a technique of accurately adjusting the flatness of the plate-shaped heating unit.

SUMMARY

According to a first aspect of the present disclosure, there is provided an attitude adjustment method for adjusting an attitude of a first heating unit in a three-dimensional a modeling apparatus including plasticizing unit producing a plasticized material by plasticizing a material, a nozzle ejecting the plasticized material, a stage having a modeling surface on which the plasticized material is stacked, a moving unit changing a relative position of the nozzle and the stage, the first heating unit in a plate shape having a heating surface heating the plasticized material stacked on the stage and a through hole formed therein, in which at least a part of the nozzle is located at modeling of a three-dimensional modeled object, a first supporting unit configured to change a relative position to the stage together with the nozzle and the first heating unit and placing the first heating unit in a position facing the stage by supporting the first heating unit, and an attitude changing portion configured to fix and change the attitude of the first heating unit. The attitude adjustment method includes (a) fixing the attitude of the first heating unit by the attitude changing portion with the heating surface and the modeling surface or a jig provided in parallel to the modeling surface in contact in a first planar position, (b) measuring flatness of the heating surface by a planar sensor for measuring the flatness of the heating surface, (c) determining a second planar position where the heating surface and the modeling surface or the jig provided in parallel to the modeling surface are brought into contact based on the measured flatness, and (d) bringing the heating surface and the modeling surface or the jig provided in parallel to the modeling surface into contact and fixing the attitude of the first heating unit by the attitude changing portion in the determined second planar position with a change of the attitude by the attitude changing portion allowed.

BRIEF DESCRIPTION OF THE DRAWINGS

FIG. 7 is a perspective view showing a vicinity of a mounting member.

FIG. 20 is a diagram for explanation of effects of an embodiment.

DESCRIPTION OF EMBODIMENTS

A. First Embodiment

Figure 1:
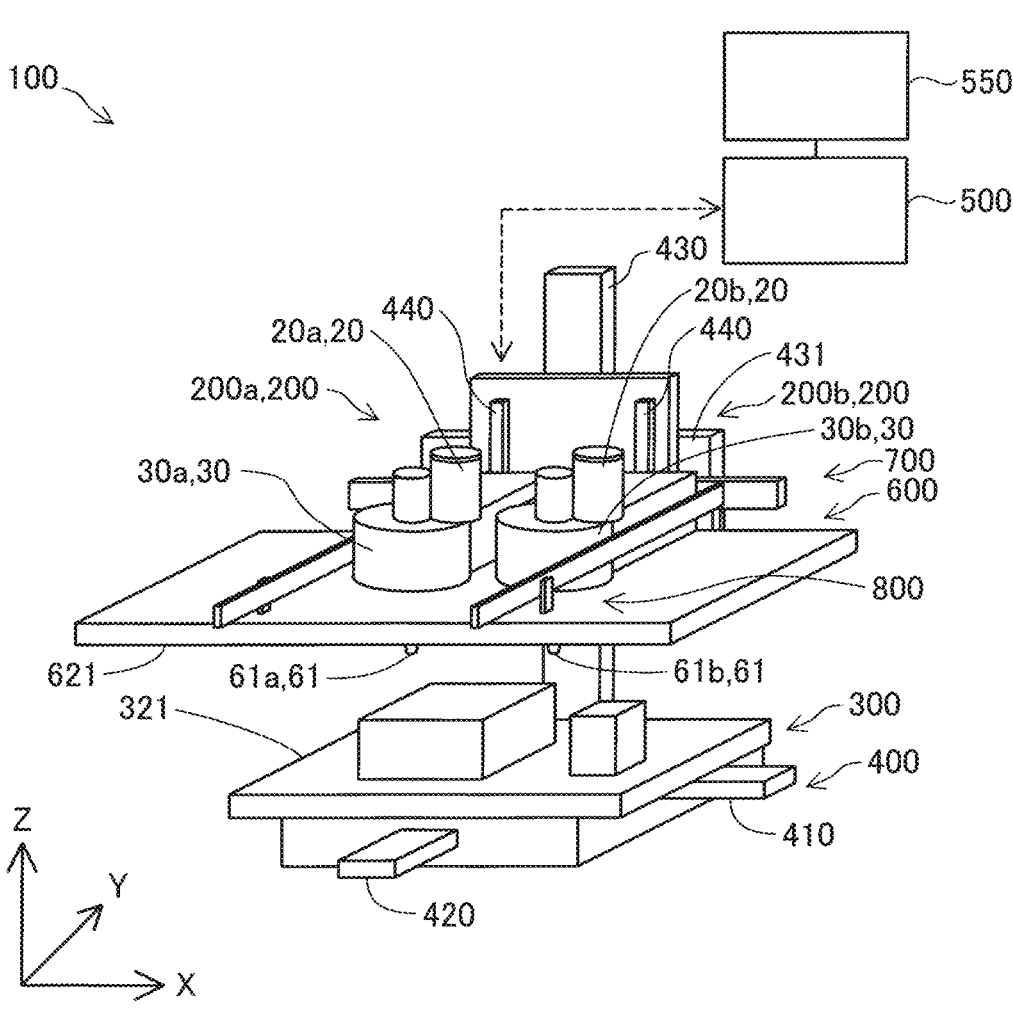
FIG. 1 is a first diagram showing a schematic configuration of a three-dimensional modeling apparatus.
Figure 2:
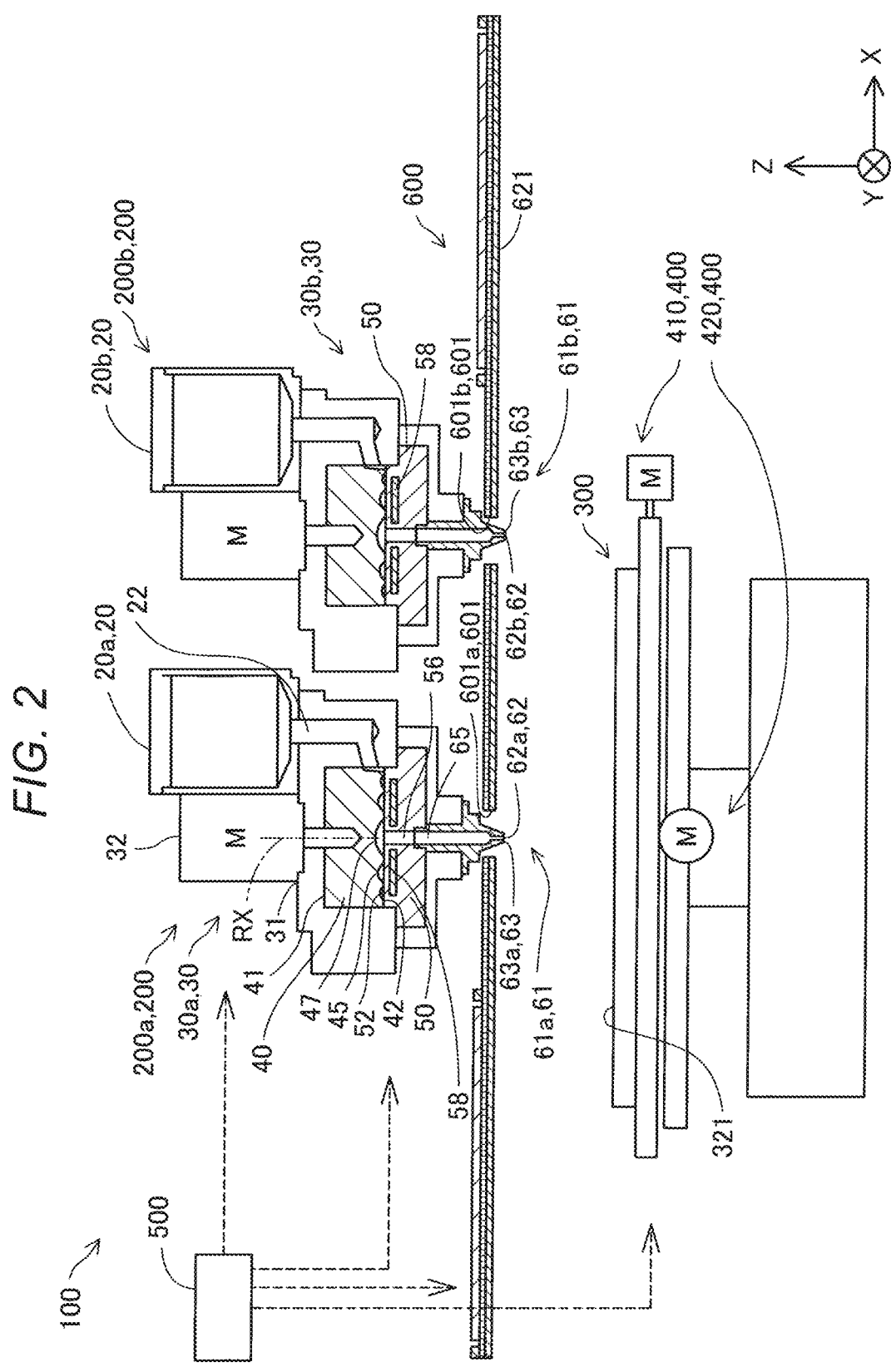
FIG. 2 is a second diagram showing the schematic configuration of the three-dimensional modeling apparatus.

FIG. 1 is a first diagram showing a schematic configuration of a three-dimensional modeling apparatus 100 according to a first embodiment. FIG. 2 is a second diagram showing the schematic configuration of the three-dimensional modeling apparatus 100 according to the first embodiment. FIGS. 1 and 2 show arrows along X, Y, and Z directions orthogonal to one another. The X, Y, and Z directions are directions along an X-axis, a Y-axis, and a Z-axis as three spatial axes orthogonal to one another, and include both a direction toward one side and an opposite direction thereto along the X-axis, the Y-axis, and the Z-axis. The X-axis and the Y-axis are axes along a horizontal plane, and the Z-axis is an axis along a vertical line. The –Z direction is the vertical direction and the +Z direction is a direction opposite to the vertical direction. The –Z direction is also referred to as "lower" and the +Z direction is also referred to as "upper". In the other drawings, the arrows along the X, Y, and Z directions are shown as appropriate. The X, Y, and Z directions in FIGS. 1 and 2 and the X, Y, and Z directions in the other drawings indicate the same directions.

The three-dimensional modeling apparatus 100 includes a modeling unit 200, a stage 300, a moving unit 400, a control unit 500, a first heating unit 600, and a first supporting unit 700 having an attitude changing portion 800.

The control unit 500 is a control device controlling an operation of the entire three-dimensional modeling apparatus 100. The control unit 500 is formed using a computer including one or more processors, a memory, and an input and output interface for external input and output of signals. A display unit 550 is coupled to the control unit 500. The control unit 500 executes three-dimensional modeling processing and attitude adjustment processing, which will be described later, by the processor executing a program or a command read into a main storage device. Note that the control unit 500 may be realized by a combination of a plurality of circuits for realizing at least a part of the respective functions in place of the computer.

Under control of the control unit 500, the modeling unit 200 ejects a plasticized material in a paste form, which is obtained by plasticization of a solid-state material, onto the stage 300 for modeling as a base of a three-dimensional modeled object. The modeling unit 200 includes a material supply section 20 as a supply source of a material before being converted into the plasticized material, a plasticizing section 30 that plasticizes the material to produce the plasticized material, and a nozzle 61 that ejects the produced plasticized material. The modeling unit 200 is also referred to as a head.

The three-dimensional modeling apparatus 100 of the embodiment includes a first modeling unit 200a and a second modeling unit 200b as the modeling unit 200. The first modeling unit 200a includes a first material supply section 20a as the material supply section 20, a first plasticizing section 30a as the plasticizing section 30, and a first nozzle 61a as the nozzle 61. The second modeling unit 200b includes a second material supply section 20b as the material supply section 20, a second plasticizing section 30b as the plasticizing section 30, and a second nozzle 61b as the nozzle 61. The first modeling unit 200a and the second modeling unit 200b are arranged side by side in the X directions so that the position of the first nozzle 61a in the Y directions and the position of the second nozzle 61b in the Y directions coincide with each other. In the embodiment, the second modeling unit 200b is disposed in a position in the +X direction with respect to the first modeling unit 200a. Since the configuration of the first modeling unit 200a and the configuration of the second modeling unit 200b are the same, in the following description, when the units are not particularly distinguished from each other, the units may be simply referred to as the modeling unit 200. In order to distinguish the component members of the units, a reference sign "a" is added to the component member of the first modeling unit 200a and a reference sign "b" is added to the constituent member of the second modeling unit 200b.

A material in a state of pellet, powder, or the like is stored in the material supply section 20. In the embodiment, an ABS resin formed in pellets is used as the material. The material supply section 20 in the embodiment includes a hopper. As shown in FIG. 2, a supply path 22 that couples the material supply section 20 and the plasticizing section 30 is provided under the material supply section 20. The material supply section 20 supplies the material to the plasticizing section 30 via the supply path 22.

As shown in FIG. 2, the plasticizing section 30 includes a screw case 31, a drive motor 32, a screw 40, and a barrel 50. The plasticizing section 30 plasticizes at least a part of the material supplied from the material supply section 20 to produce a paste-like plasticized material having fluidity and supplies the plasticized material to the nozzle 61. "Plasticizing" has a concept including melting and is to change a solid state to a state having fluidity. Specifically, for a material with glass transition, plasticizing is to raise the temperature of the material to be equal to or higher than a glass transition point. In a case of a material without glass transition, "plasticizing" is to raise the temperature of the material to be equal to or higher than a melting point.

Figure 3:
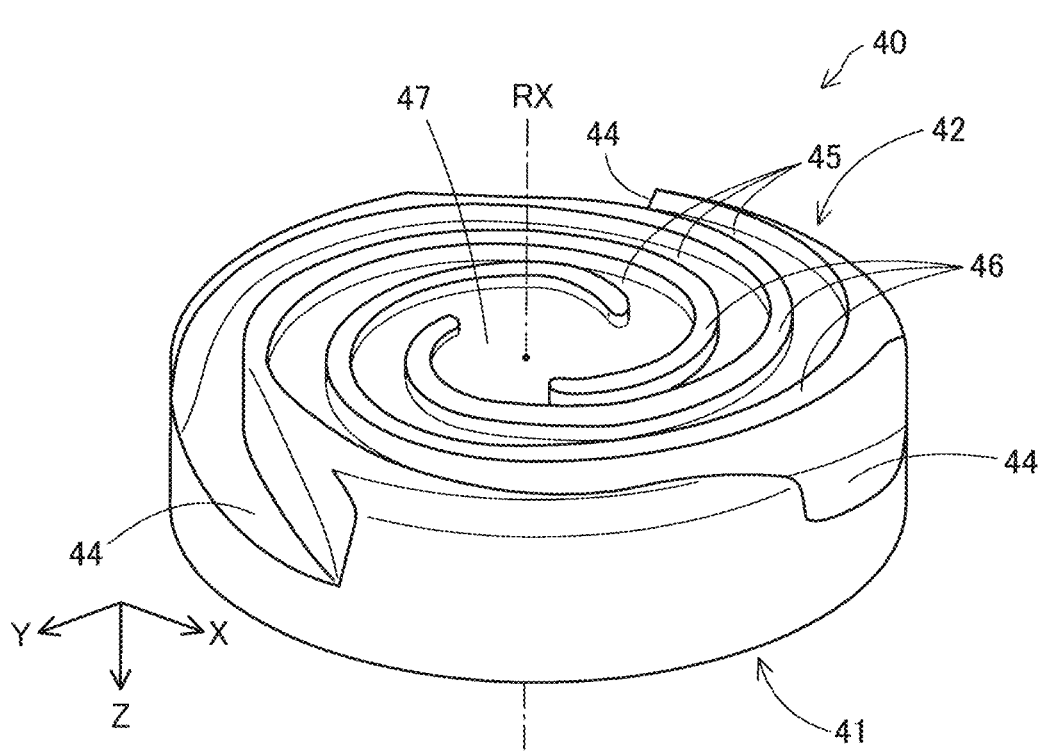
FIG. 3 is a perspective view showing a schematic configuration of a screw.
Figure 4:
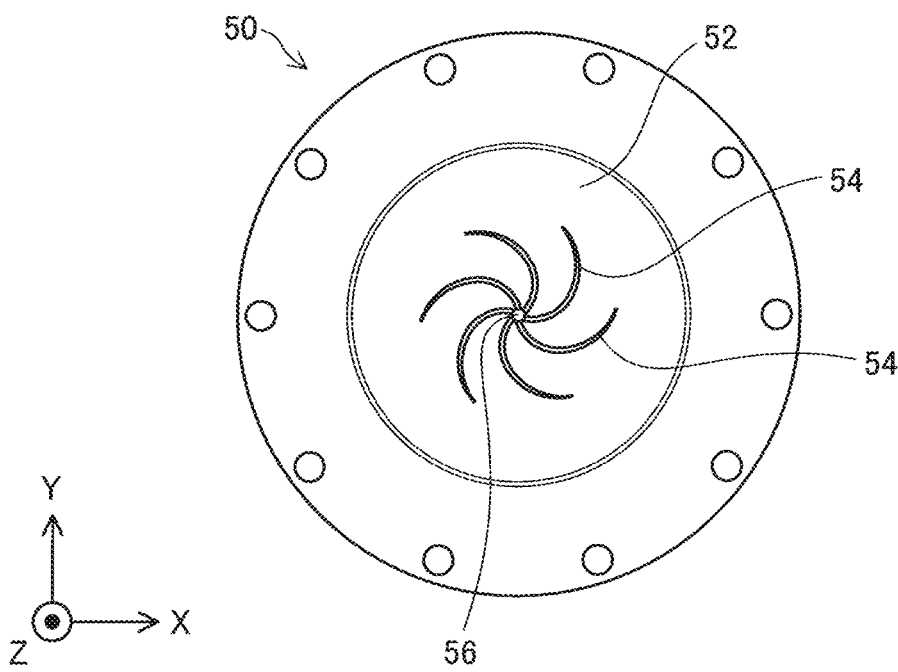
FIG. 4 is a schematic plan view of a barrel.

FIG. 3 is a perspective view showing a schematic configuration of a screw lower surface 42 side of the screw 40. FIG. 4 is a schematic plan view showing a barrel upper surface 52 side of the barrel 50. The screw 40 has a substantially cylindrical shape with a length in an axial direction as a direction along a center axis RX thereof being smaller than a length in a direction orthogonal to the axial direction thereof. The screw 40 is disposed so that the center axis RX as a rotation center thereof is parallel to the Z directions. The screw 40 is also referred to as a flat screw, a rotor, or a scroll.

As shown in FIG. 2, the screw 40 is housed in the screw case 31. A screw upper surface 41 side of the flat screw 40 is coupled to the drive motor 32. The flat screw 40 is rotated in the screw case 31 by a rotational drive force generated by the drive motor 32. The drive motor 32 is driven under control of the control unit 500. Note that the screw 40 may be driven by the drive motor 32 via a reducer.

As shown in FIG. 3, spiral groove portions 45 are formed in the screw lower surface 42. The above described supply path 22 of the material supply section 20 communicates with the groove portions 45 from a side surface of the screw 40. The groove portion 45 is continuous to a material introduction port 44 formed in the side surface of the screw 40. The material introduction port 44 is a portion that receives the material supplied via the supply path 22 of the material supply section 20. As shown in FIG. 3, in the embodiment, the three groove portions 45 are formed to be isolated by protruding portions 46. The number of the groove portions 45 is not limited to three, but may be one, two, or more. The shape of the groove portion 45 is not limited to the spiral shape, but may be a helical shape or an involute curve shape or may be a shape extending to draw an arc from a center portion 47 toward the outer circumference.

As shown in FIG. 2, the barrel 50 is disposed under the screw 40. The barrel upper surface 52 faces the screw lower surface 42. A space is formed between the groove portions 45 of the screw lower surface 42 and the barrel upper surface 52. In the barrel 50, a communication hole 56 communicating with a nozzle flow path 65 of the nozzle 61, which will be described later, is provided on the center axis RX of the screw 40. A plasticization heater 58 is provided in the barrel 50 in a position facing the groove portions 45 of the screw 40. The temperature of the plasticization heater 58 is controlled by the control unit 500.

As shown in FIG. 4, a plurality of guide grooves 54 are formed around the communication hole 56 in the barrel upper surface 52. One end of each guide groove 54 is coupled to the communication hole 56 and extends in a spiral shape from the communication hole 56 toward the outer circumference of the barrel upper surface 52. Each guide groove 54 has a function of guiding the plasticized material to the communication hole 56. Note that one end of the guide groove 54 may not be coupled to the communication hole 56. The guide grooves 54 may not be formed in the barrel 50.

The material supplied into the groove portions 45 of the screw 40 flows along the groove portions 45 according to the rotation of the screw 40 while being plasticized in the groove portions 45 and is guided to the center portion 47 of the screw 40 as the plasticized material. The paste-like plasticized material flowing into the center portion 47, which exhibits fluidity, is supplied to the nozzle 61 via the communication hole 56. Note that not all kinds of substances forming the plasticized material are necessarily plasticized. It is only necessary that the plasticized material is converted in a state having fluidity as a whole by plasticization of at least part of the kinds of substances forming the plasticized material.

As shown in FIG. 2, the nozzle 61 has the nozzle flow path 65 and a tip surface 63 provided with a nozzle opening 62. The nozzle flow path 65 is a flow path for the plasticized material formed in the nozzle 61 and coupled to the communication hole 56 of the above described barrel 50. The tip surface 63 is a surface forming a tip portion of the nozzle 61 and projecting in the −Z direction toward the stage 300. The nozzle opening 62 is a portion provided in an end portion of the nozzle flow path 65 on a side communicating with the atmosphere, in which the cross section of the nozzle flow path 65 is reduced. A first nozzle opening 62a is formed in a first tip surface 63a of the first nozzle 61a, and a second nozzle opening 62b is formed in a second tip surface 63b of the second nozzle 61b. The plasticized material produced by the plasticizing section 30 is supplied to the nozzle 61 via the communication hole 56 and is ejected from the nozzle opening 62 via the nozzle flow path 65.

The stage 300 is disposed in a position facing the nozzle opening 62. The three-dimensional modeling apparatus 100 models a three-dimensional modeled object by ejecting the plasticized material from the nozzle opening 62 toward a modeling surface 321 of the stage 300 and stacking a layer of the plasticized material on the modeling surface 321. The plasticized material layer stacked on the modeling surface 321 is also referred to as a modeling layer. The details of the stage 300 will be described later.

The moving unit 400 changes the relative position of the nozzle 61 and the stage 300. In the embodiment, the moving unit 400 changes the relative position of the nozzle 61 and the stage 300 by moving the modeling unit 200 in the Z directions as a stacking direction, and moving the stage 300 in a direction intersecting the stacking direction. More specifically, the moving unit 400 of the embodiment changes the relative position of the nozzle 61 and the stage 300 in the Z directions by moving the modeling unit 200 in the 2 directions and changes the relative position of the nozzle 61 and the stage 300 in the X directions and the Y directions by moving the stage 300 in the X directions and the Y directions orthogonal to the Z directions. As shown in FIG. 1, the moving unit 400 includes a first electric actuator 410 that moves the stage 300 in the X directions, a second electric actuator 420 that moves the stage 300 and the first electric actuator 410 in the Y directions, and a third electric actuator 430 that moves the modeling unit 200 along the Z directions. More specifically, the third electric actuator 430 moves the first modeling unit 200a and the second modeling unit 200b along the Z directions by moving a movable portion 431 with the first modeling unit 200a and the second modeling unit 200b fixed thereto along the Z directions. The third electric actuator 430 and the movable portion 431 are omitted in FIG. 2.

As shown in FIG. 1, further, a first supporting unit 700 is fixed to the movable portion 431. The first supporting unit 700 supports the first heating unit 600, and thereby, disposes the first heating unit 600 in a position facing the stage 300. Therefore, the third electric actuator 430 in the embodiment moves the first supporting unit 700 along the Z directions together with the modeling unit 200 while maintaining the positional relationship between the modeling unit 200 and the first supporting unit 700. That is, the first supporting unit 700 is configured so that the relative position to the nozzle 61 and the stage 300 is changed. Similarly, the first heating unit 600 supported by the first supporting unit 700 is configured so that the relative position to the nozzle 61 and the stage 300 is changed. In FIG. 2, the first supporting unit 700 is omitted.

The first electric actuator 410 to the third electric actuator 430 are driven under control of the control unit 500. In other embodiments, for example, the moving unit 400 may move the stage 300 in the Z directions and move the modeling unit 200 along the X directions and the Y directions, may move the stage 300 in the X directions, the Y directions, and the Z directions without moving the modeling unit 200, or may move the modeling unit 200 in the X directions, the Y directions, and the Z directions without moving the stage 300. Hereinafter, the change in the relative position of the nozzle 61 to the stage 300 may be simply referred to as movement of the nozzle 61. In the embodiment, for example, the movement of the stage 300 in the +X direction with respect to the nozzle 61 may be restated as movement of the nozzle 61 in the −X direction. Similarly, the change in the relative position of the modeling unit 200, the first heating unit 600, and the first supporting unit 700 to the stage 300 may be simply referred to as movement of the modeling unit 200, the first heating unit 600, and the first supporting unit 700.

Figure 5:
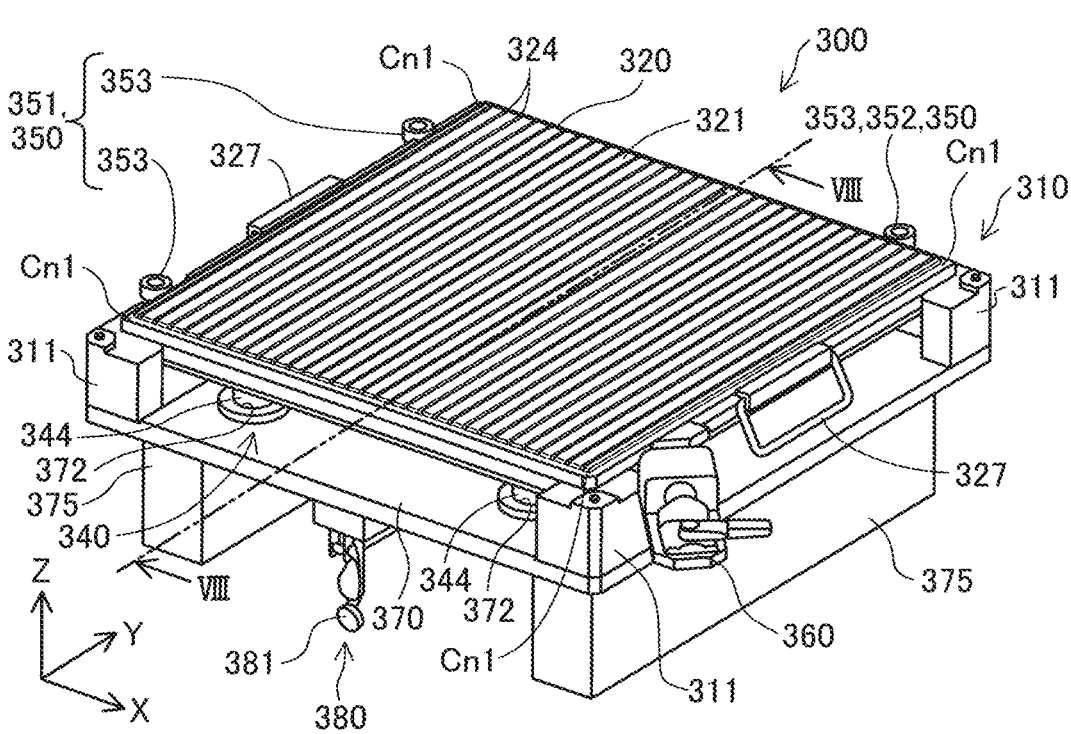
FIG. 5 is a perspective view showing a schematic configuration of a stage.
Figure 6:
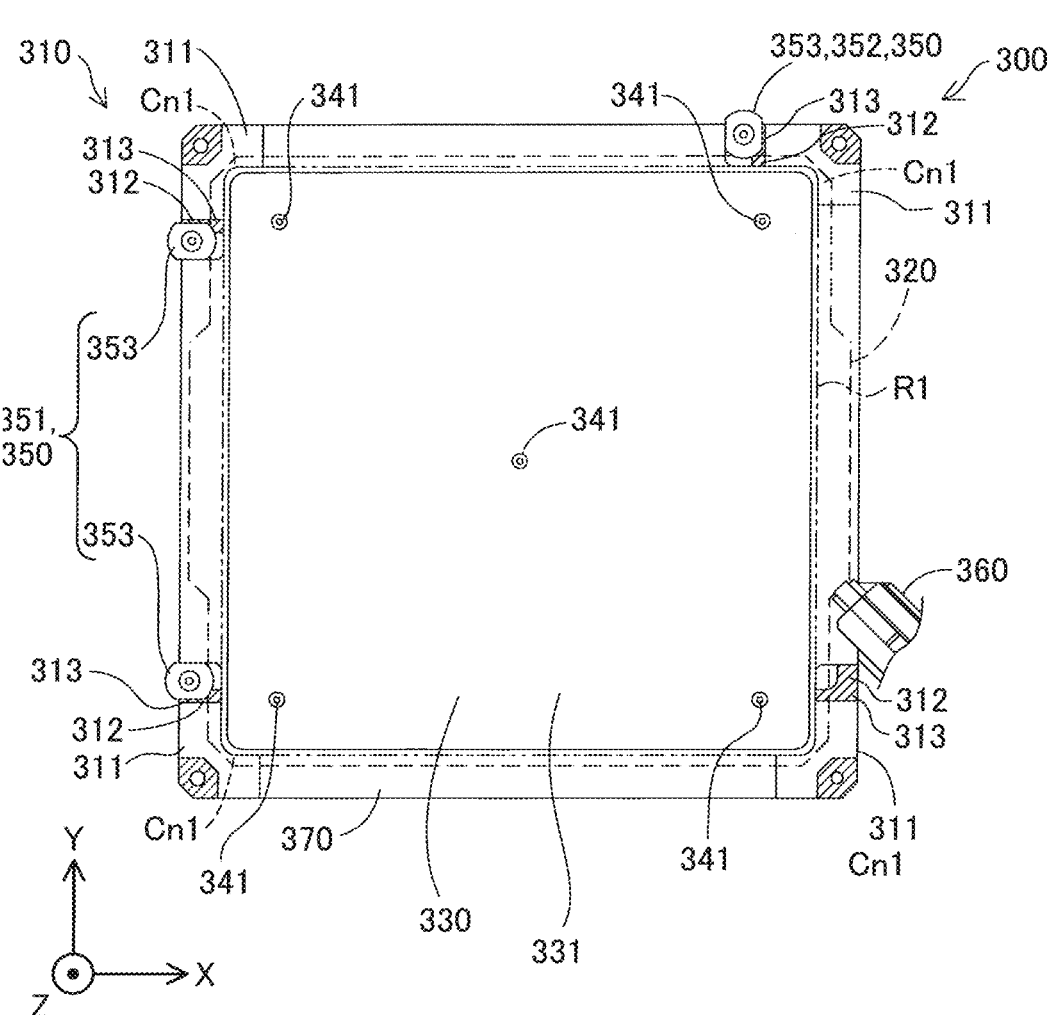
FIG. 6 is a top view of the stage.

FIG. 5 is a perspective view showing a schematic configuration of the stage 300 in the embodiment. FIG. 6 is a top view of the stage 300 without a modeling stage 320. As shown in FIGS. 5 and 6, the stage 300 includes a mounting unit 310, the modeling stage 320, a second heating unit 330, a pressing unit 340, a holding unit 350, an urging unit 360, a second supporting unit 370, and a pressing moving unit 380.

The modeling stage 320 is mounted on the mounting unit 310 as will be described later. In the embodiment, the modeling stage 320 is detachably formed from the mounting unit 310 in the stage 300. The modeling stage 320 in the embodiment is mounted on the mounting unit 310 and fixed by the holding unit 350 and the urging unit 360, and thereby, attached to the stage 300. For example, a user grips a pair of handles 327 fixed to the modeling stage 320 with the modeling stage 320 in between in the X directions, and attaches and detaches the modeling stage 320.

As shown in FIG. 5, the modeling stage 320 has the above described modeling surface 321. The modeling stage 320 in the embodiment has a plurality of corner portions Cn1 as seen along the Z directions perpendicular to the modeling surface 321. More specifically, the modeling stage 320 has a substantially rectangular plate shape and has four corner portions Cn1.

In the embodiment, the modeling surface 321 is disposed to be parallel to the X directions and the Y directions as a whole. In the specification, the term "surface" includes not only a surface formed only by a flat surface but also a surface which can be grasped as a surface occupying a certain area. For example, concavities and convexities may be formed in the surface. For example, in the modeling surface 321 in the embodiment, a plurality of grooves 324 are formed at predetermined intervals. The groove 324 is formed so as to extend along the Y directions. In other embodiments, the modeling stage 320 may not have the grooves 324 formed therein.

As shown in FIG. 6, the mounting unit 310 is disposed outside the second heating unit 330 as seen along the Z directions. The mounting unit 310 in the embodiment includes four mounting members 311. Each mounting member 311 is disposed to correspond to each corner portion Cn1 of the modeling stage 320. More specifically, in the embodiment, each mounting member 311 has a substantially L-shape as seen along the Z directions, and is disposed to define each corner portion of a substantially rectangular region R1 by the inner wall of the part bending in an L-shape of each mounting member 311. Thereby, each mounting member 311 is disposed outside the second heating unit 330 to surround the second heating unit 330 that is disposed inside the region R1 as seen along the Z directions.

Figure 7:
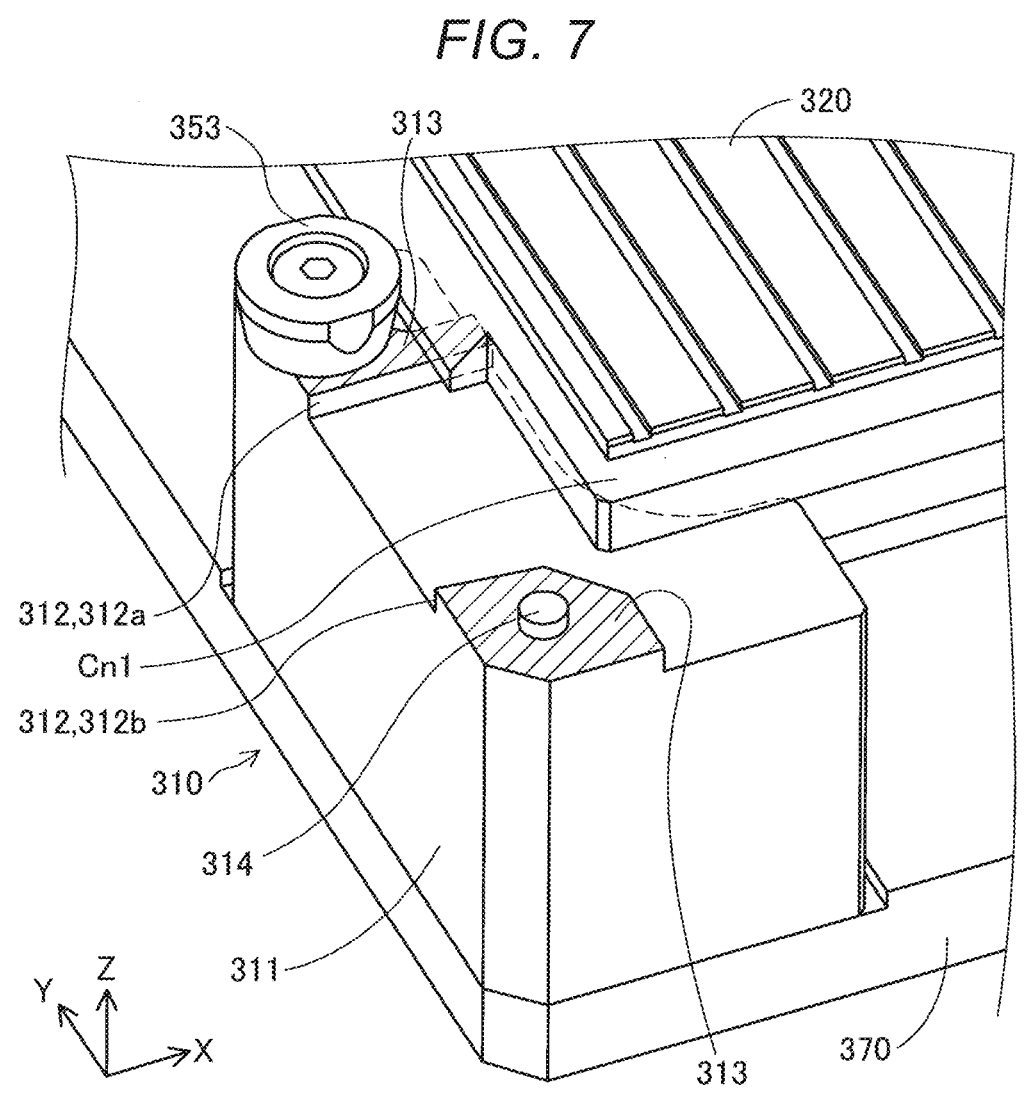

FIG. 7 is a perspective view showing a vicinity of the mounting member 311. FIG. 7 is an enlarged view of the vicinity of the mounting member 311 disposed at the end in the −X direction and the −Y direction in FIG. 5. In FIG. 7, of the mounting member 311, a part overlapping with the modeling stage 320 is indicated by a broken line. As shown in FIGS. 6 and 7, the mounting member 311 has a step portion 312. The step portion 312 is a portion projecting in the +Z direction from portions other than the step portion 312 in the mounting member 311. The upper surface of the step portion 312 in the embodiment forms a reference surface 313 with adjusted flatness. That is, the step portion 312 is the portion having the reference surface 313 of the mounting unit 310. The flatness of the reference surface 313 is preferably, for example, 100 μm or less. In FIGS. 6 and 7, the reference surfaces 313 are hatched. The mounting member 311 shown in FIG. 7 is provided with a first step portion 312*a* and a second step portion 312*b* as the step portion 312. In other embodiments, the entire upper surface of the mounting member 311 may be configured as the reference surface 313.

As shown in FIG. 6, in the embodiment, the step portion 312 is provided in a position corresponding to each corner portion Cn1 of the modeling stage 320. As shown in FIG. 7, the modeling stage 320 is mounted on the reference surface 313 so that a lower surface thereof is in contact with a part of the reference surface 313 of the step portion 312. In FIG. 7, the modeling stage 320 is mounted on the reference surface 313 of the first step portion 312*a* of the step portion 312. On the reference surface 313 of the second step portion 312*b*, a convex first engagement portion 314 projecting in the +Z direction is provided. The second step portion 312*b* is provided in the most corner portion of the mounting member 311.

The second supporting unit 370 is provided under the mounting unit 310 and the second heating unit 330. The second supporting unit 370 supports the mounting unit 310. In the embodiment, the second supporting unit 370 is fixed to the above described second electric actuator 420 via a pair of bases 375 shown in FIG. 5. The respective bases 375 have substantially rectangular parallelepiped shapes elongated in the Y directions, and are disposed along the Y directions to face each other in the X directions.

It is preferable that a part of the mounting unit 310 having the reference surface 313 like the step portion 312 in the embodiment is formed using a member having a lower coefficient of thermal expansion than that of the second supporting unit 370. For example, it is preferable that, when the second supporting unit 370 is formed using steel or stainless steel, the step portion 312 is formed using invar or the like. In the embodiment, the entire mounting member 311 is formed using invar. The second supporting unit 370 is formed using steel.

Figure 8:
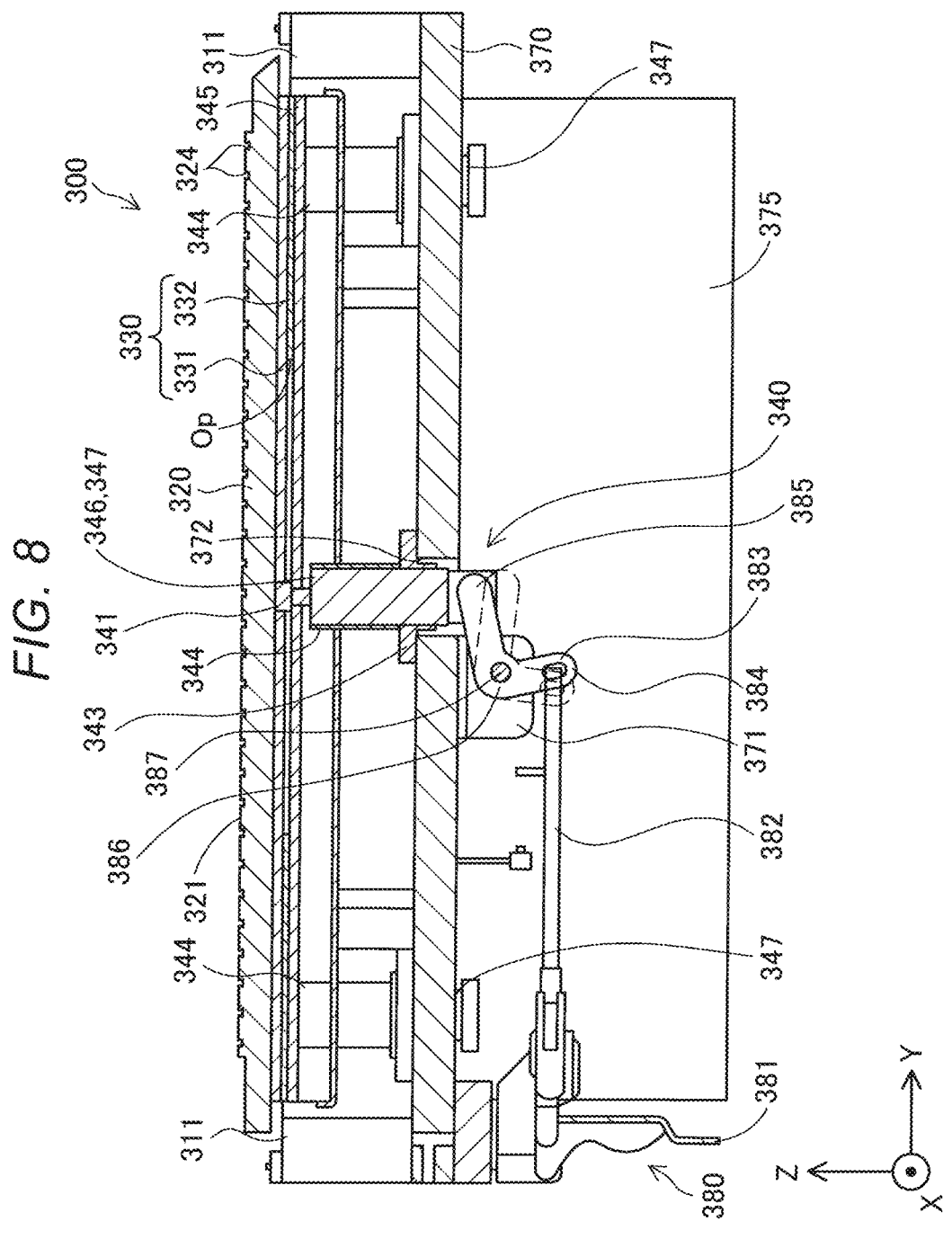
FIG. 8 is a sectional view cut along line VIII-VIII in FIG. 5.

FIG. 8 is a sectional view cut along line VIII-VIII in FIG. 5. As shown in FIG. 8, the second heating unit 330 is disposed under the modeling stage 320 inside the peripheral edge of the modeling stage 320 as seen along the Z directions. More specifically, as shown in FIGS. 6 and 8, the second heating unit 330 is disposed in the above described region R1 as seen along the Z directions not to be in contact with the mounting unit 310. The second heating unit 330 heats the modeling stage 320.

Figures 9, 10:
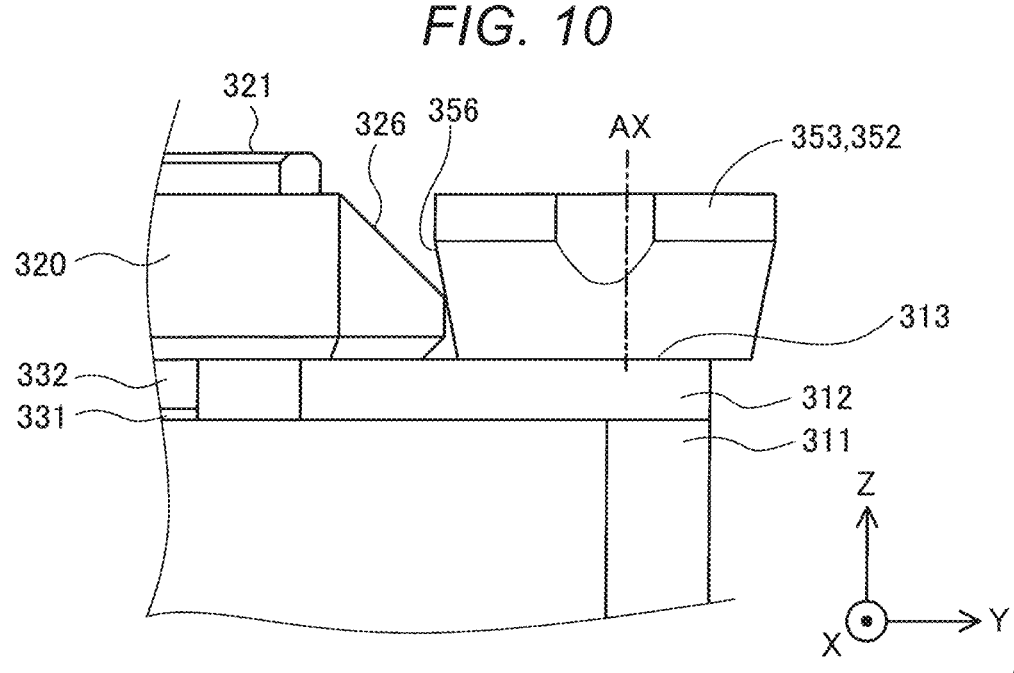
FIG. 9 is an exploded perspective view of a second heating unit.
FIG. 10 shows a second pressing portion and a vicinity thereof.

FIG. 9 is an exploded perspective view of the second heating unit 330. FIG. 9 also shows a mounting plate 345 to be described later. The second heating unit 330 includes a second heating plate 331 and a second heater 332. In the embodiment, the second heater 332 is formed using a rubber heater and has a substantially rectangular plate shape. An opening portion Op having a substantially rectangular opening shape is formed in a center portion of the second heater 332 in the X directions and the Y directions. The second heater 332 is electrically coupled to the control unit 500 via a wire (not shown). The output and the temperature of the second heater 332 are controlled by the controller 500. In another embodiment, the second heater 332 may include, for example, a halogen heater, a nichrome wire heater, and a carbon heater. The second heating plate 331 is formed using aluminum and has a substantially rectangular plate shape. The second heating plate 331 is stacked on the second heater 332.

As shown in FIG. 8, the pressing unit 340 is provided below the second heating unit 330. The pressing unit 340 presses the second heating unit 330 against the modeling stage 320 from below. The pressing unit 340 in the embodiment includes a plurality of urging members 344, the mounting plate 345, and columns 347.

The mounting plate 345 has a plate shape, and the second heating unit 330 is mounted thereon. In the embodiment, the mounting plate 345 is formed using aluminum. As shown in FIG. 9, the mounting plate 345 in the embodiment has a substantially rectangular plate shape and has four corner portions Cn2. As shown in FIG. 8, the columns 347 having cylindrical shapes extending along the Z directions are coupled to a center portion of the mounting plate 345 in the X directions and the Y directions and positions corresponding to the respective corner portions Cn2. Particularly, the column 347 placed in the center portion of the mounting plate 345 is also referred to as a center column 346. The urging members 344 urge the mounting plate 345 toward the modeling stage 320. The urging members 344 are provided to correspond to the center portion and the corner portions Cn2 of the mounting plate 345. In the embodiment, the five urging members 344 are provided to correspond to the center portion and the respective corner portions Cn2 of the mounting plate 345. More specifically, in the embodiment, each urging member 344 is formed using a coil spring having a substantially cylindrical shape, and is disposed to surround the outer circumference of each column 347.

Each column 347 is provided under the mounting plate 345. Each column 347 is fixed to the mounting plate 345 by screwing of a positioning screw 341 into a screw hole provided in the upper surface thereof. A part of the center column 346 is located inside a hole 372 provided in the second supporting unit 370. A spacer 343 is provided in the hole 372 to fill the gap between the center column 346 and the second supporting unit 370. The urging member 344 is formed as a coil spring having a substantially cylindrical shape, and is provided between the mounting plate 345 and the spacer 343 on the outer circumference of the center column 346. The second heating unit 330 is urged upward by the elastic force of the urging members 344, and is pressed against the modeling stage 320 from below. Hereinafter, a state in which the second heating unit 330 is pressed against the modeling stage 320 by the pressing unit 340 is also referred to as a pressed state.

The pressing moving unit 380 is configured to move the pressing unit 340 in a backward direction away from the modeling stage 320 and in a forward direction toward the modeling stage 320. In the embodiment, the backward direction is a vertically downward direction. The forward direction is a vertically upward direction.

The pressing moving unit 380 in the embodiment includes a first lever 381, a rod 382, and a second lever 383. The rod 382 is formed in an elongated shaft shape along the axial direction thereof, and is disposed along the Y directions. The rod 382 couples the first lever 381 and the second lever 383. The second lever 383 has a substantially L-shape as seen along the X directions, and has one end portion 384 and another end portion 385, and a bent portion 386 coupling the one end portion 384 and the other end portion 385. The second lever 383 is fixed to a fixing member 371 fixed to a lower surface of the second supporting unit 370 in the vicinity of the center portion in the X directions and the Y directions. More specifically, the second lever 383 is fixed to the fixing member 371 by a pin 387 penetrating the bent portion 386 in the X directions pivotably around the pin 387 in the Y-Z plane along the Y directions and the Z directions. An end portion of the rod 382 at the side in the +Y direction is coupled to the one end portion 384 of the second lever 383. A lower end portion of the center column 346 is coupled to the other end portion 385.

The first lever 381 is pulled in the −Y direction, and thereby, the rod 382 moves in the −Y direction. The rod 382 moves in the −Y direction, and thereby, the one end portion 384 of the second lever 383 moves in the −Y direction and the second lever 383 pivots in the Y-Z plane around the pin 387. The second lever 383 pivots, and thereby, the other end portion 385 of the second lever 383 moves downward and the center column 346 moves downward. The downward movement of the center column 346 lowers the mounting plate 345 fixed to the center column 346 while contracting the respective urging members 344. In this manner, the pressed state is released by the pressing moving unit 380. Conversely, the first lever 381 is pressed in the +Y direction in a state in which the pressed state is released to cause the pressing moving unit 380 to raise the pressing unit 340, and thereby, the second heating unit 330 can be pressed against the modeling stage 320. The first lever 381 may be operated by, for example, a user's hand, or may be configured to operate by an actuator (not shown) for moving the first lever 381 under control of the control unit 500.

The holding unit 350 shown in FIGS. 5 and 6 relatively holds the modeling stage 320 to the reference surfaces 313. The holding unit 350 includes first holding portions 351 and a second holding portion 352. The first holding portions 351 are provided at end portions of the mounting unit 310 at the side in the −X direction. The second holding portion 352 is provided at an end portion of the mounting unit 310 at the side in the +Y direction. The first holding portions 351 and the second holding portion 352 include eccentric pins 353.

FIG. 10 shows the second holding portion 352 and a vicinity thereof. Side surfaces of the modeling stage 320 have first inclined surfaces 326 having lower ends inclined to be horizontally farther from the modeling surface 321 than upper ends thereof. More specifically, in the embodiment, the side surfaces of the modeling stage 320 at the sides in the −X direction, the +X direction, and the +Y direction are formed as the first inclined surfaces 326. An angle formed by the modeling surface 321 and the first inclined surface 326 is preferably equal to or larger than 95° and equal to or smaller than 135° at the inner side of the modeling stage 320. In the embodiment, the angle formed by the modeling surface 321 and the first inclined surface 326 is set to 135° at the inner side of the modeling stage 320. The holding unit 350 has second inclined surfaces 356 facing the first inclined surfaces 326 of the modeling stage 320. More specifically, the second inclined surface 356 is inclined to have a lower end located horizontally at the inner side of the eccentric pin 353 than an upper end thereof. The second inclined surfaces 356 contact the first inclined surfaces 326, and thereby, the modeling stage 320 is relatively held by the reference surfaces 313. As in the embodiment, when the angle formed by the modeling surface 321 and the first inclined surface 326 is 135° at the inner side of the modeling stage 320, the angle of the acute angle formed by the modeling surface 321 and the second inclined surface 356 is preferably 80° or more and less than 90°. Thereby, even when the modeling stage 320 expands due to the temperature increase of the modeling stage 320, the modeling stage 320 can be effectively held by the holding unit 350 while warpage of the modeling stage 320 is suppressed.

Each eccentric pin 353 has a pin rotation axis AX. The axial direction of the pin rotation axis AX is a direction along the Z-axis. The pin rotation axis AX is provided at a position deviated from the center of the eccentric pin 353. The eccentric pin 353 is rotatably provided with the pin rotation axis AX as a rotation axis. The position of the modeling stage 320 in the direction along the modeling surface 321 is adjusted by the user rotating the eccentric pin 353 around the pin rotation axis AX. Since the pin rotation axis AX is provided in the position deviated from the center of the eccentric pin 353, a distance between the pin rotation axis AX and a part of the second inclined surface 356 in contact with the first inclined surface 326 is changed by the eccentric pin 353 being rotated around the pin rotation axis AX. Accordingly, the eccentric pin 353 is rotated around the pin rotation axis AX, and thereby, the position of the modeling stage 320 in the directions along the modeling surface 321 is changed. The position of the end portion of the modeling stage 320 at the side in the −X direction is adjusted by the user rotating the eccentric pin 353 of the first holding portion 351 around the pin rotation axis AX. The position of the end portion of the modeling stage 320 at the side in the +Y direction is adjusted by the user rotating the eccentric pin 353 of the second holding portion 352 around the pin rotation axis AX.

The urging unit 360 shown in FIG. 5 urges the modeling stage 320 toward the holding unit 350. The urging unit 360 is provided at an end portion of the stage 300 at the side in the +X direction. The urging unit 360 has inclined surfaces (not shown) facing the first inclined surfaces 326 at the side in the +X direction of the modeling stage 320, and urges the modeling stage 320 toward the holding unit 350 by bringing the inclined surfaces into contact with the first inclined surfaces 326. Note that the stage 300 may not include the urging unit 360.

Figure 11:
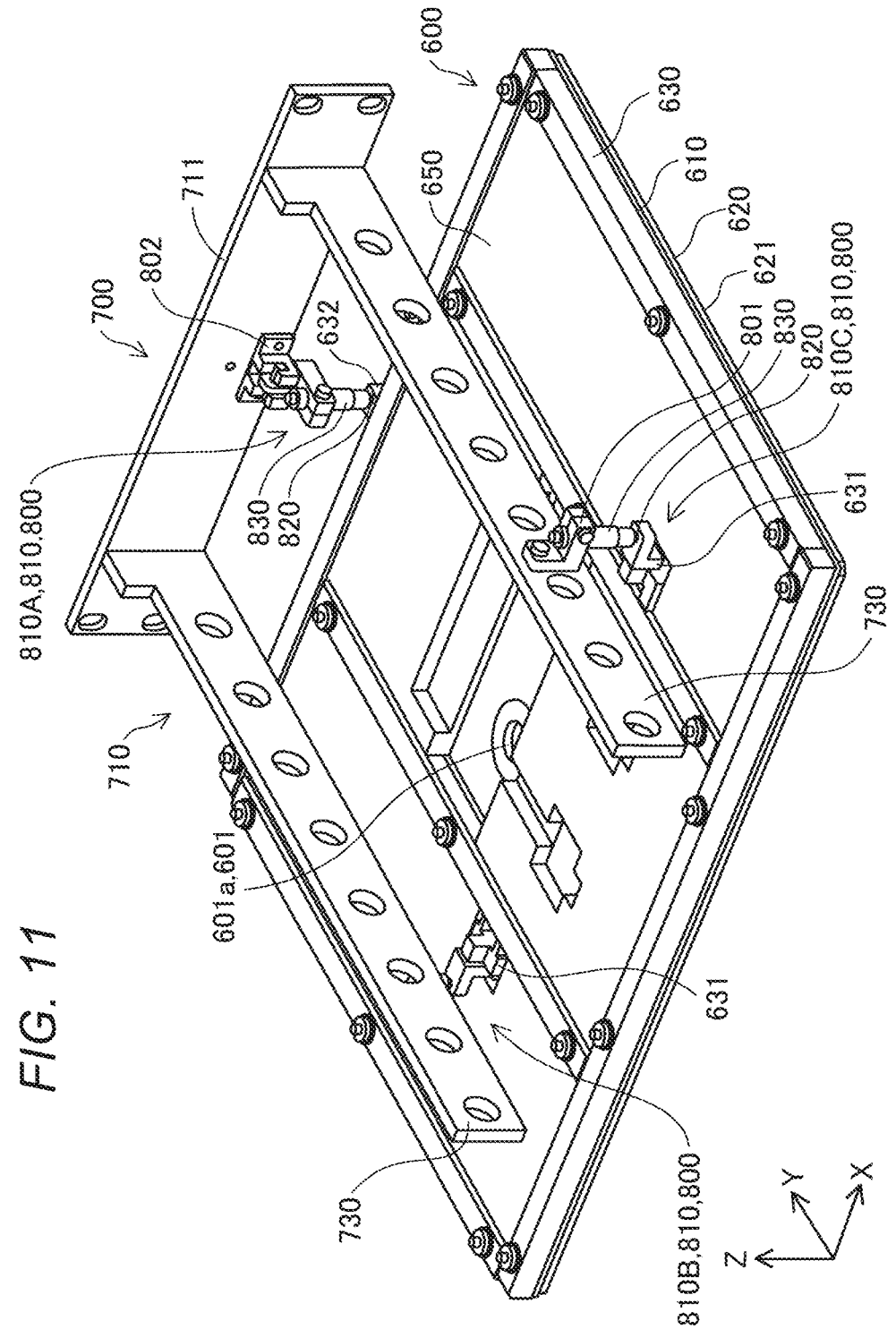
FIG. 11 is a perspective view showing a schematic configuration of a first heating unit and a first supporting unit.
Figure 12:
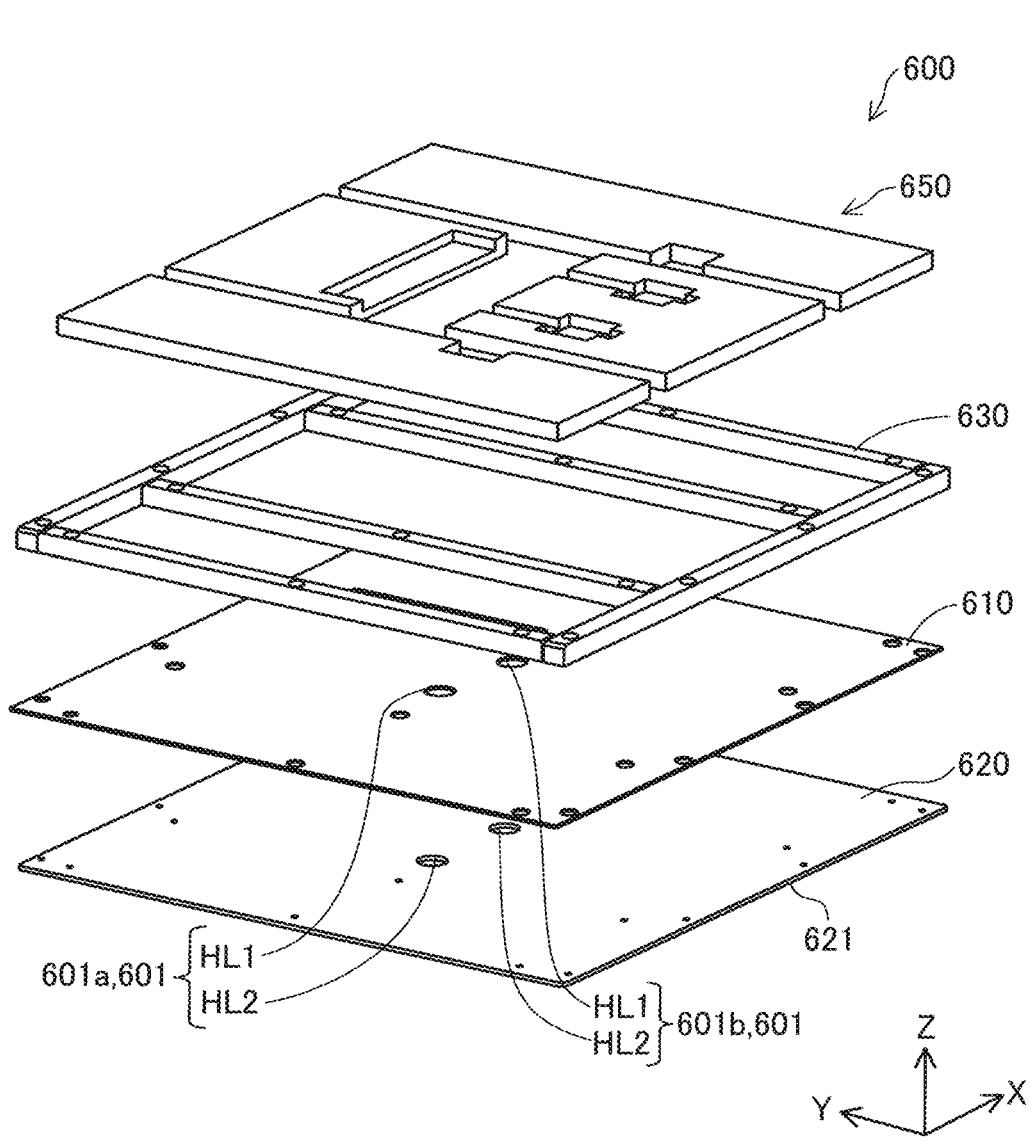
FIG. 12 is an exploded perspective view of the first heating unit.

FIG. 11 is a perspective view showing a schematic configuration of the first heating unit 600 and the first supporting unit 700 in the embodiment. FIG. 12 is an exploded perspective view of the first heating unit 600. As shown in FIGS. 11 and 12, the first heating unit 600 includes a first heater 610, a first heating plate 620 that transmits the heat of the first heater 610 to the plasticized material stacked on the modeling surface 321, a frame portion 630 that supports the first heating plate 620, and a heat insulating portion 650 formed using a heat insulating material. As shown in FIG. 12, the first heating plate 620, the first heater 610, the frame portion 630, and the heat insulating portion 650 are sequentially stacked from the bottom.

As shown in FIGS. 2, 11, and 12, in the first heating unit 600, a through hole 601 that penetrates the first heating unit 600 in a direction orthogonal to a surface direction of the unit is formed. In the embodiment, a first through hole 601a and a second through hole 601b are formed as the through hole 601 in the first heating unit 600. The first through hole 601a and the second through hole 601b are formed in a center portion of the first heating unit 600 in the Y directions. The second through hole 601b is formed at the side in the +X direction of the first through hole 601a. Hereinafter, when the first through hole 601a and the second through hole 601b are not particularly distinguished from each other, the holes are simply referred to as the through hole 601. As shown in FIG. 12, in the embodiment, the through hole 601 is formed by a hole HL1 formed to penetrate the first heater 610 in the Z directions and a hole HL2 formed to penetrate the first heating plate 620 in the Z directions being continuous in the Z directions.

At least a part of the nozzle 61 is located in the through hole 601 as shown in FIG. 2 when the plasticized material is ejected to model a three-dimensional modeled object. In FIG. 2, the circumference of the nozzle 61 is surrounded by the first heating unit 600 as seen along the Z directions. Hereinafter, "when a plasticized material is ejected and a three-dimensional modeled object is modeled" is simply referred to as "at modeling of a three-dimensional modeled object" or "at modeling". In the embodiment, at modeling of a three-dimensional modeled object, the nozzle opening 62 is disposed between a heating surface 621 and the modeling surface 321 in the Z directions. Note that "between the heating surface 621 and the modeling surface 321" does not include the same position as the heating surface 621 or the same position as the modeling surface 321.

The nozzle 61 may not be located in the through hole 601 at times other than the time of modeling. For example, in the embodiment, the nozzle 61 is positioned above the first heating unit 600 and is not positioned in the through hole 601 while attitude adjustment processing, which will be described later, is executed. More specifically, in the embodiment, under control of the control unit 500, the modeling unit 200 is moved to above the first heating unit 600 by a fourth electric actuator 440 shown in FIG. 1, and thereby, the nozzle 61 is moved to above the first heating unit 600. As described above, the fourth electric actuator 440 moves the modeling unit 200 in the Z directions, and thereby, switches a state in which the nozzle 61 is located in the through hole 601 and a retracted state in which the nozzle 61 is located above the first heating unit 600, not located in the through hole 601. Hereinafter, to move the nozzle 61 to above the first heating unit 600 is also referred to as "retract the nozzle 61" or "retract the modeling unit 200". Note that, in another embodiment, for example, the fourth electric actuator 440 may be configured to switch the state in which the nozzle 61 is located in the through hole 601 and the retracted state by moving the first heating unit 600 in the Z directions relative to the modeling unit 200.

The first heater 610 shown in FIG. 12 includes a rubber heater having a rectangular plate shape. The first heater 610 is electrically coupled to the control unit 500 via a wire (not shown). The output and the temperature of the first heater 610 are controlled by the control unit 500. In another embodiment, the first heater 610 may include, for example, a halogen heater, a nichrome wire heater, and a carbon heater.

In the embodiment, the first heating plate 620 has a rectangular plate shape. The lower surface of the first heating plate 620 forms the heating surface 621. The heating surface 621 refers to a surface closer to the modeling surface 321 among surfaces of the first heating unit 600. The area of the heating surface 621 is larger than the area of the modeling surface 321. The first heater 610 is directly attached to the upper surface of the first heating plate 620. The first heating plate 620 supplies the heat supplied from the first heater 610 to the modeling layer via the heating surface 621. In another embodiment, for example, the first heater 610 may be fixed to the first heating plate 620 via an adhesive or may be fixed to the first heating plate 620 by a fastener such as a bolt.

In the embodiment, the first heating plate 620 is formed using aluminum. Accordingly, for example, compared with a case where the first heating plate 620 is formed using steel or stainless steel, the heat of the first heater 610 can be more efficiently transmitted to the plasticized material by the first heating plate 620 and the first heating plate 620 can be reduced in weight. In another embodiment, the first heating plate 620 may be formed using, for example, steel or stainless steel.

The first supporting unit 700 includes the attitude changing portion 800 configured to allow a change in attitude of the first heating unit 600. More specifically, the first supporting unit 700 in the embodiment includes a supporting member 710 and suspending portions 810 that function as the attitude changing portion 800.

The supporting member 710 is fixed so that the relative position to the stage 300 is changed together with the nozzle 61. The supporting member 710 in the embodiment includes a fixing plate 711 and a pair of arm portions 730. The fixing plate 711 has a rectangular plate shape elongated in the X directions and is fixed to the movable portion 431 so that the plate surface thereof is along the X directions and the Z directions and the longitudinal direction thereof is along the X directions. The arm portions 730 extend from the fixing plate 711 in the −Y direction and are fixed to the fixing plate 711 to face each other in the X directions.

As shown in FIG. 11, in the embodiment, the first supporting unit 700 has the three suspending portions 810. In the embodiment, a first suspending portion 810A suspends and supports the center portion in the X direction of the end portion in the Y direction of the first heating unit 600. More specifically, the first suspending portion 810A suspends and supports the first heating unit 600 in the −Z direction from the center in the X direction of the fixing plate 711. A second suspending portion 810B and a third suspending portion 810C support the side in the −Y direction of the center position in the Y direction of the first heating unit 600. More specifically, the second suspending portion 810B suspends and supports the first heating unit 600 in the −Z direction from the arm portion 730 disposed at the side in the −X direction. The third suspending portion 810C suspends and supports the first heating unit 600 in the −Z direction from the arm portion 730 disposed at the side in the +X direction.

Figure 13:
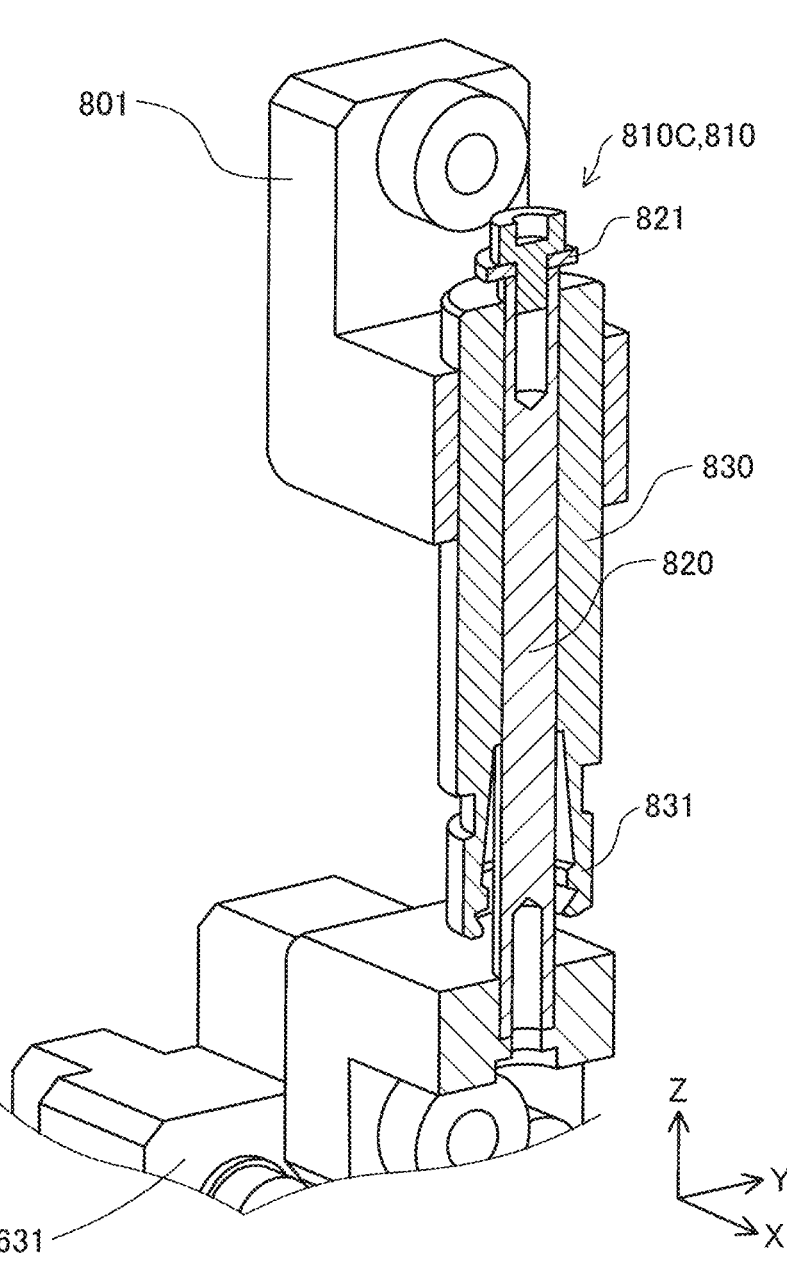
FIG. 13 is a sectional view of a suspending portion.

FIG. 13 is a sectional view of the suspending portion 810. FIG. 13 shows a cross-section of 810C of the three suspending portions 810. As described above, the suspending portion 810 suspends and supports the first heating unit 600 from the supporting member 710. As shown in FIG. 13, the suspending portion 810 includes a movable member 820 and a restricting member 830. The movable member 820 moves along a suspension direction relative to the supporting member 710, and thereby, changes the position of the first heating unit 600 in the suspension direction. The suspension direction refers to a direction in which the suspending portion 810 suspends the first heating unit 600. The restricting member 830 allows and restricts movement of the movable member 820 along the suspension direction. The restricting member 830 allows the movement of the movable member 820 to allow a change of the attitude of the first heating unit 600, and restricts the movement of the movable member 820 to fix the attitude of the first heating unit 600.

More specifically, in the embodiment, the movable member 820 is configured as an axial shaft elongated along the axial direction thereof. The restricting member 830 is configured as an outer diameter gripping collet chuck having a substantially cylindrical shape elongated along the axial direction thereof. The movable member 820 is inserted into the restricting member 830 to penetrate the restricting member 830 along the axial direction of the restricting member 830. A flange portion 821 is provided at an upper end portion of the movable member 820. The flange portion 821 suppresses the movable member 820 from falling off the restricting member 830, and determines the maximum amount of downward projection of the movable member 820 from the restricting member 830. As shown in FIG. 11, lower end portions of the movable member 820 of the first suspending portion 810A and the second suspending portion 810B are fixed to the frame portion 630 of the first heating unit 600 via first fixing members 631. Upper end portions of the restricting members 830 of the first suspending portion 810A and the second suspending portion 810B are fixed to the arm portions 730 via second fixing members 801. A lower end portion of the movable member 820 of the third suspending portion 810C is fixed to the frame portion 630 via the third fixing member 632. An upper end portion of the restricting member 830 of the third suspending portion 810C is fixed to the fixing plate 711 via a fourth fixing member 802. The lower end portion of each suspending portion 810 may be fixed to the first fixing member 631 or the third fixing member 632 by a rod end or a link ball.

The restricting member 830 is configured to grip the movable member 820 inserted into the restricting member 830 by opening and closing a chuck portion 831. When the chuck portion 831 is opened, the grip of the movable member 820 is released and the movement of the movable member 820 is allowed. When the chuck portion 831 is closed, the movable member 820 is gripped by the restricting member 830, and the movement of the movable member 820 is restricted.

Figure 14:
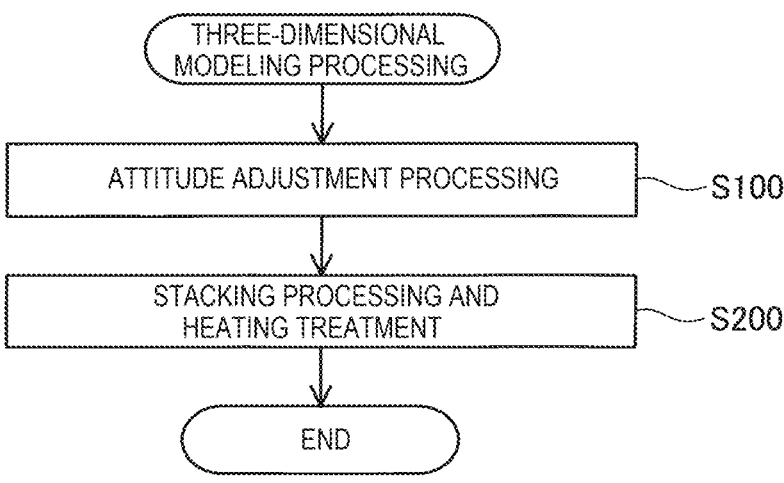
FIG. 14 is a flowchart showing three-dimensional modeling processing.

FIG. 14 is a flowchart of three-dimensional modeling processing for realizing a method of manufacturing a three-dimensional modeled object in the embodiment.

At step S100, attitude adjustment processing for adjusting the attitude of the first heating unit 600 is executed. In the attitude adjustment processing, the attitude of the first heating unit 600 is adjusted so that the flatness of the heating surface 621 of the first heating unit 600 is increased.

After the attitude of the first heating unit 600 is adjusted at step S100, stacking processing and heat treatment are executed at step S200. The stacking processing is processing of modeling a three-dimensional modeled object by the control unit 500 controlling the moving unit 400 and the plasticizing section 30 to eject the plasticized material from the nozzle 61 to the stage 300 while moving the nozzle 61, and stacking the modeling layers on the modeling surface 321. The heat treatment is processing heating the plasticized material stacked in the stacking processing by the control unit 500 using the first heating unit 600 in the attitude adjusted at step S100. The ejected plasticized material is heated by the first heating unit 600, and thereby, the adhesion strength between the modeling layers is increased and the modeling accuracy of the three-dimensional modeled object is improved.

Figure 15:
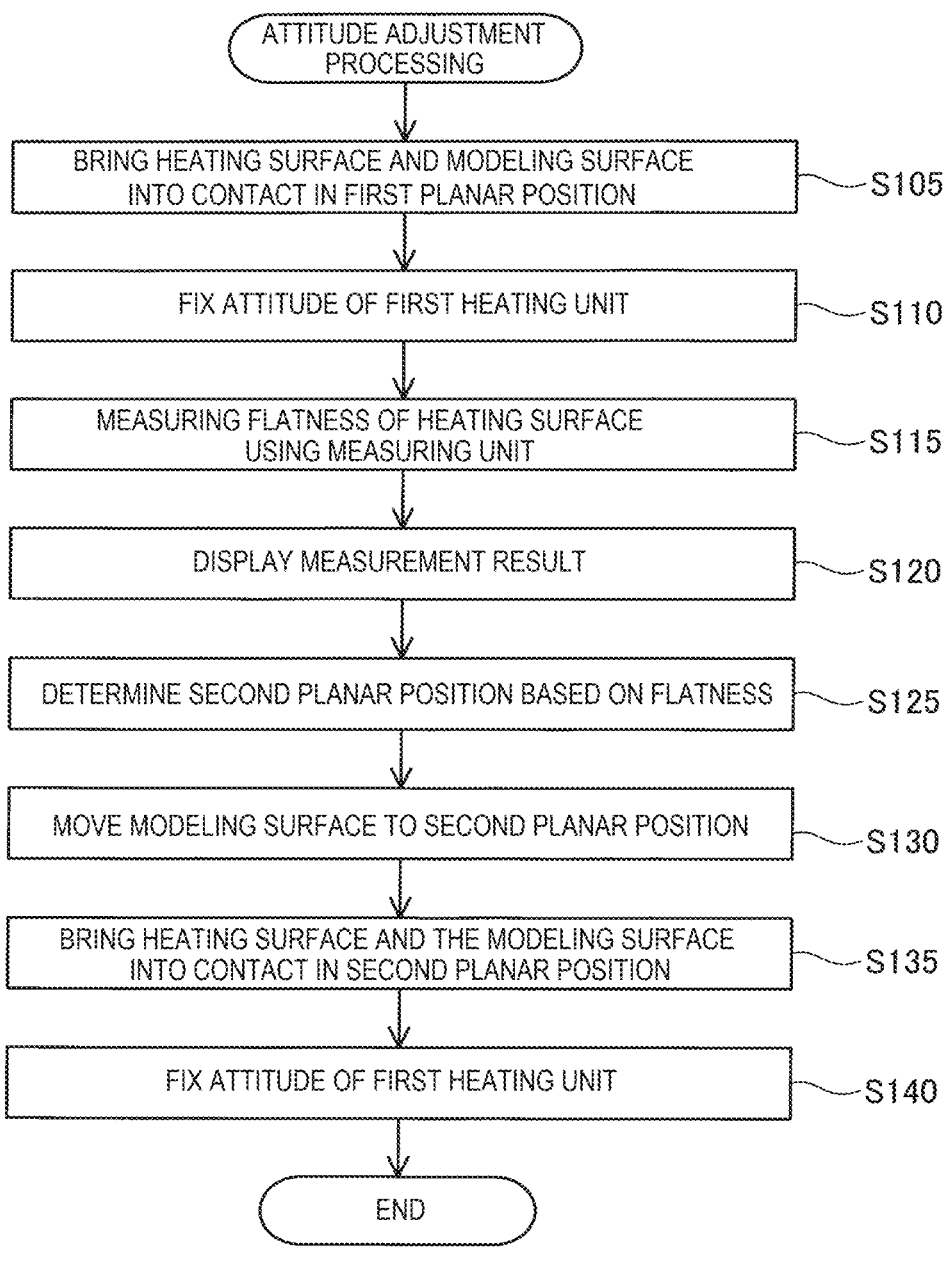
FIG. 15 is a detailed flowchart of attitude adjustment processing.

FIG. 15 is a detailed flowchart of the attitude adjustment processing. At step S105, the heating surface 621 of the first heating unit 600 and the modeling surface 321 of the modeling stage 320 are brought into contact with each other in a first planar position. Specifically, first, the user opens the chuck portions 831 of the three restricting members 830, and thereby, release the grip of the movable members 820 by the restricting members 830 and allow the movement of the movable members 820 along the suspension direction to set the attitude of the first heating unit 600 to be changeable. Then, the control unit 500 controls the fourth electric actuator 440 to retract the nozzle 61 to above the first heating unit 600, and controls the third electric actuator 430 to set the position of the first heating unit 600 in the Z directions to an initial position. The initial position is, for example, a position where the first heating unit 600 is moved closest to the side in the +Z direction. Then, the controller 500 controls the first electric actuator 410 and the second electric actuator 420 to move the modeling surface 321 of the stage 300 to the first planar position. The first planar position is a predetermined position in the X and Y directions, for example, a position where the center of the modeling surface 321 in the X and Y directions coincides with the center of the heating surface 621 in the X and Y directions. After moving the stage 300 to the first planar position, the control unit 500 lowers the first heating unit 600 to a position where the heating surface 621 and the modeling surface 321 contact. The distance for lowering the first heating unit 600 is a predetermined distance. Specifically, at the distance, all of the flange portions 821 provided at the upper ends of the three movable members 820 that are allowed to move along the suspension direction are separated from the restricting members 830. The first heating unit 600 is lowered and the heating surface 621 is brought into contact with the modeling surface 321 as described above, and thereby, the heating surface 621 is brought into contact with the entire modeling surface 321.

At step S110, the attitude of the first heating unit 600 is fixed. Specifically, the user closes the chuck portions 831 of the three regulating members 830 with the heating surface 621 and the modeling surface 321 in contact, and thereby, the respective regulating members 830 grip the movable members 820 to restrict the movement of the respective movable members 820 along the suspension direction and the attitude of the first heating unit 600 is fixed.

Figure 16:
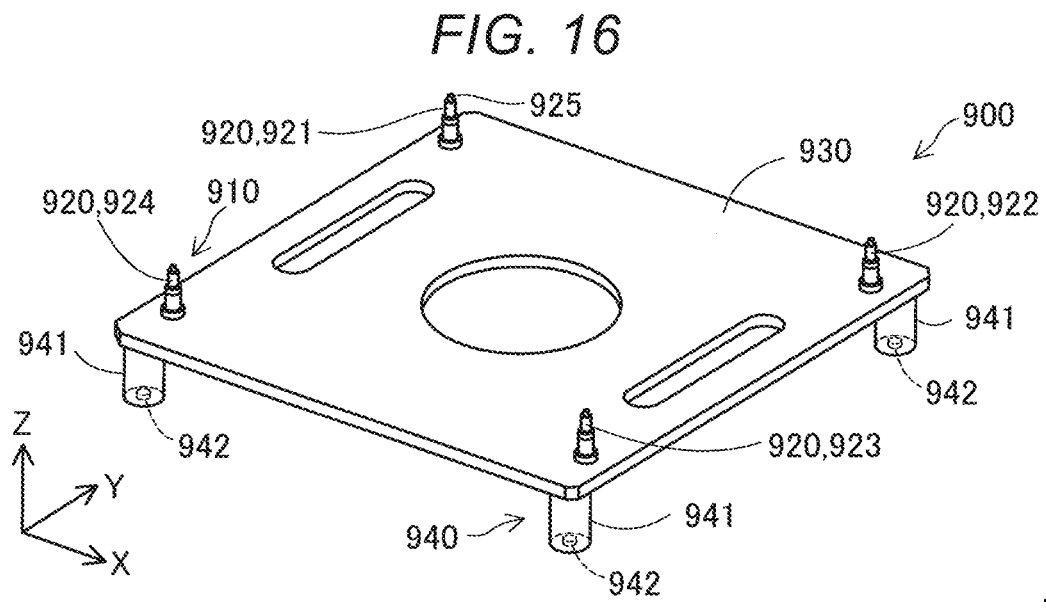
FIG. 16 is a perspective view of a measuring unit.

At step S115, the flatness of the heating surface 621 is measured using a measuring unit 900 shown in FIG. 16. At step S115, first, the control unit 500 moves the first heating unit 600 in the fixed attitude in the +Z direction. Then, the user mounts the measuring unit 900 on the mounting unit 310 of the stage 300.

Figure 17:
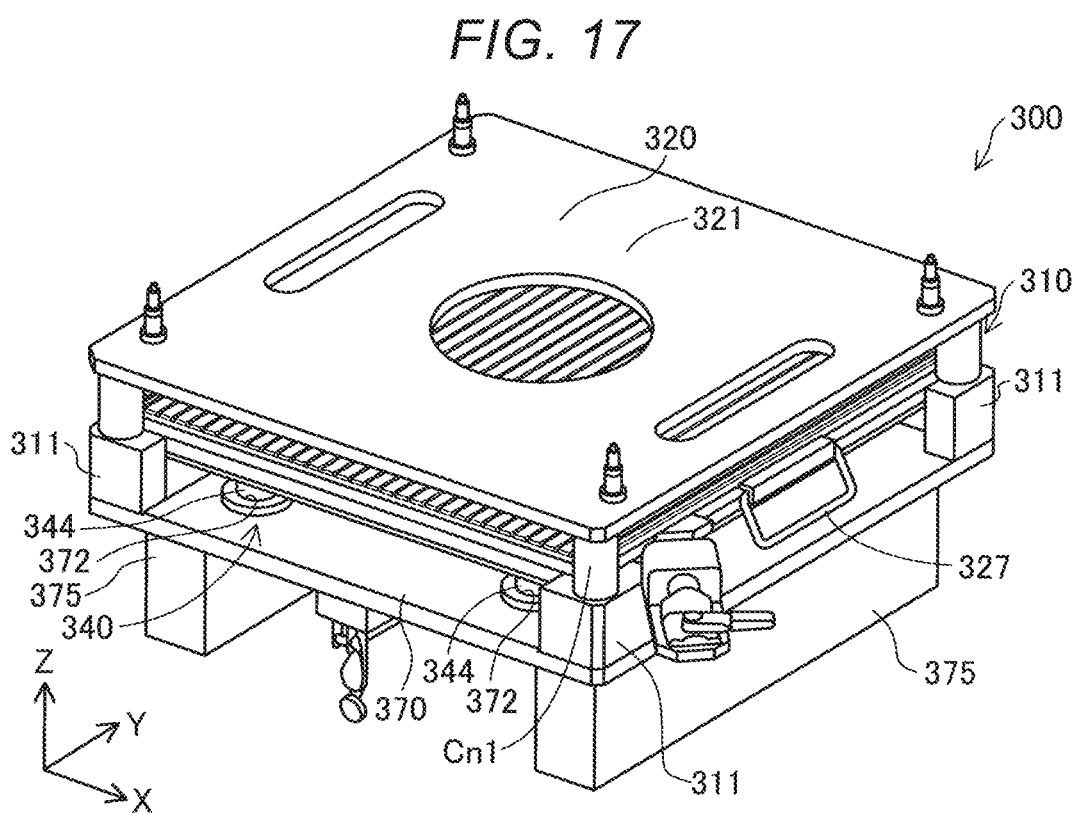
FIG. 17 is a perspective view showing a state in which the measuring unit is combined with the stage.

FIG. 16 is a perspective view of the measuring unit 900. FIG. 17 is a perspective view showing a state in which the measuring unit 900 is combined with the stage 300. The measuring unit 900 includes a plate 930 to which a planar sensor 910 is attached, and a placement section 940 for placement of the plate 930 on the stage 300. The three-dimensional modeling apparatus 100 and the planar sensor 910 can be collectively referred to as a three-dimensional modeling system.

The planar sensor 910 includes a plurality of contact sensors 920. The plurality of contact sensors 920 include a first contact sensor 921, a second contact sensor 922, a third contact sensor 923, and a fourth contact sensor 924. The first contact sensor 921, the second contact sensor 922, the third contact sensor 923, and the fourth contact sensor 924 are coupled to the control unit 500.

The contact sensor 920 is elongated along the Z directions and has a rod-like shape. At the tip of the contact sensor 920 in the +Z direction, a contact 925 to be pushed in the –Z direction is provided. When the contact 925 contacts an object and is pushed into the contact sensor 920, a contact signal indicating the contact with the object is transmitted to the control unit 500. The contact sensor 920 is configured as, for example, a B-contact type contact sensor. The pushable amount of the contact 925 is, for example, 1 to 3 mm.

The plate 930 has a substantially rectangular shape. As shown in FIG. 16, the plate 930 may be provided with holes for weight reduction. The respective contact sensors 920 are attached to four corners of the plate 930 so that the contacts 925 face in the +Z direction.

The placement section 940 includes a plurality of leg portions 941. The respective leg portions 941 are fixed to four corners of the surface of the plate 930 at the side in the –Z direction. A concave second engagement portion 942 is formed on a surface of each leg portion 941 at the side in the –Z direction. Each second engagement portion 942 engages with each first engagement portion 314 shown in FIG. 7. The measuring unit 900 is positioned with respect to the mounting unit 310 by mounting of the measuring unit 900 on the mounting unit 310 of the stage 300 so that the second engagement portion 942 engages with the first engagement portion 314. In the embodiment, the second engagement portion 942 is formed in a concave shape and the first engagement portion 314 is formed in a convex shape, however, the second engagement portion 942 may be formed in a convex shape and the first engagement portion 314 may be formed in a concave shape.

The control unit 500 controls the third electric actuator 430 with the measuring unit 900 mounted on the mounting unit 310, and lowers the first heating unit 600 until contact signals are output from all the contact sensors 920. Concurrently, the horizontal position of the stage 300 is the first planar position. The first planar position is hereinafter also referred to as a first measurement position. The control unit 500 records the control position of the third electric actuator 430 at the time when the contact signal is received from each contact sensor 920 with respect to each contact sensor 920. In this manner, values representing the respective heights of the first heating unit 600 in positions corresponding to the first contact sensor 921, the second contact sensor 922, the third contact sensor 923, and the fourth contact sensor 924 are recorded.

Figure 18:
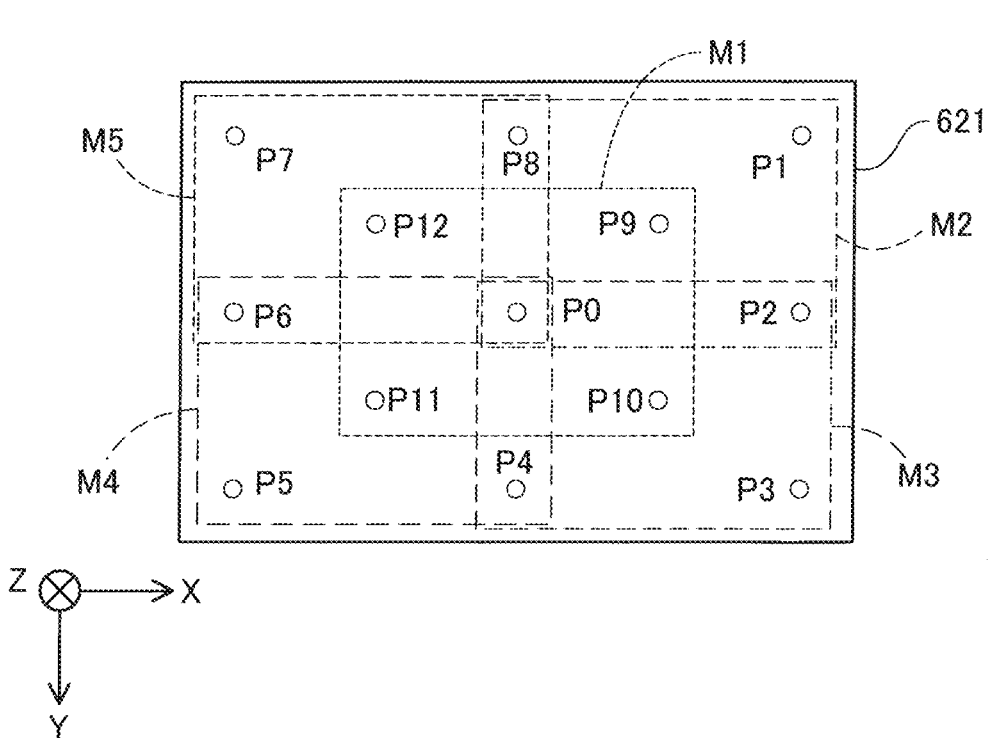
FIG. 18 is a diagram for explanation showing a measurement position of the first heating unit by the measuring unit.

FIG. 18 is an explanatory diagram showing measurement positions of the first heating unit 600 by the measuring unit 900. FIG. 18 shows the heating surface 621 of the first heating unit 600 as seen from below. The control unit 500 measures the position of the above described first heating unit 600 in the Z directions in five measurement positions M1 to M5 including the first measurement position M1. As shown in FIG. 18, the control unit 500 moves the stage 300 to the five measurement positions M1 to M5 to measure the heights of the heating surface 621 in 13 measurement points P0 to P12. The second measurement position M2 to the fifth measurement position M5 respectively have a common measurement point P0. The measurement point P0 is the center of the first measurement position M1. By the measurements in the second measurement position M2 to the fifth measurement position M5, all of the first contact sensor 921, the second contact sensor 922, the third contact sensor 923, and the fourth contact sensor 924 performs measurements at the measurement point P0. By using the measurement value at the common measurement point P0 as a reference value, the control unit 500 calculates the heights at the measurement points P1 to P12 using differences from the reference value.

When the measurement of the height of the heating surface 621 is completed, the user detaches the measuring unit 900 from the mounting portion 310. The control unit 500 calculates a difference between the maximum value and the minimum value of the measurement values at the respective measurement points P0 to P12 as the flatness.

At step S120 in FIG. 15, the control unit 500 displays the values related to flatness measured at step S115 on the display unit 550.

Figure 19:
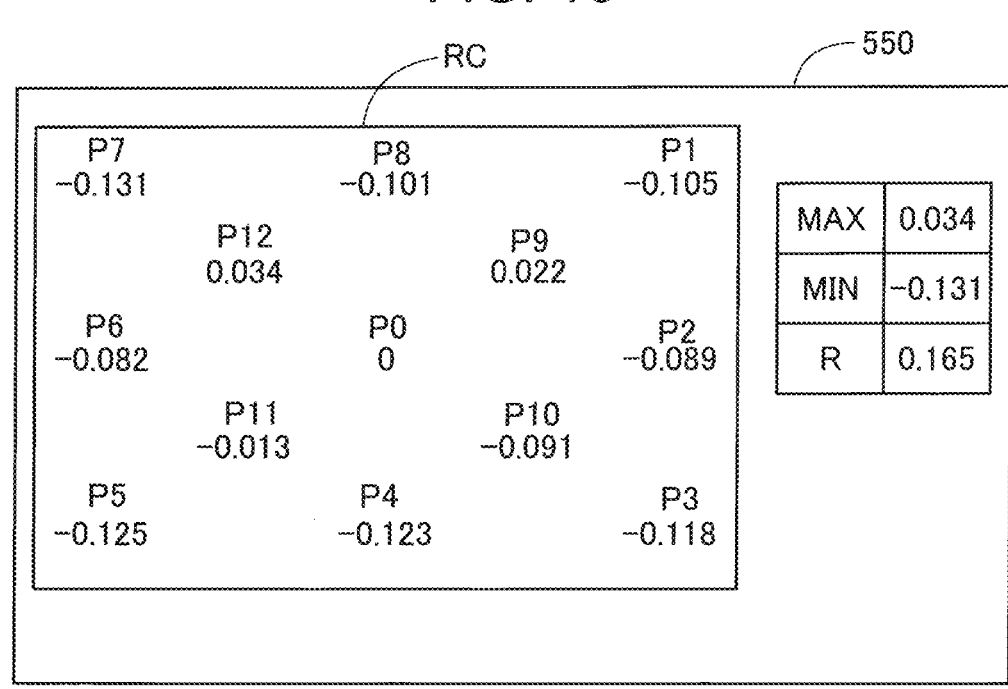
FIG. 19 shows a display example of values related to flatness.

FIG. 19 shows a display example of the values related to flatness. In the embodiment, as shown in FIG. 19, the control unit 500 expresses the heights of the heating surface 621 at the respective measurement points by the differences with the height at the measurement point P0 as 0. The control unit 500 displays the respective measurement values in a rectangular figure RC having a shape corresponding to the heating surface 621. Further, the control unit 500 displays the maximum value MAX and the minimum value MIN of the measured values, and displays a difference between the maximum value MAX and the minimum value MIN as flatness R. When the flatness R is smaller than a predetermined threshold, the control unit 500 may skip all subsequent processing and end the attitude adjustment processing.

At step S125 in FIG. 15, the control unit 500 determines a second planar position where the heating surface 621 and the modeling surface 321 are brought into contact with each other based on the measurement result of the flatness at step S115. In the embodiment, the control unit 500 determines the second planar position so that the modeling surface 321 moves in the horizontal direction toward the measurement point where the height is at the minimum value. For example, in FIG. 19, the height at the measurement point P7 is at the minimum value. Therefore, the control unit 500 determines the second planar position so that the modeling surface 321 moves in a direction from the measurement point P0 toward the measurement point P7. The relationship between the flatness R and the movement distance is determined in advance by, for example, a function or a map. The maximum movement distance of the second planar position from the first planar position is, for example, one tenth of the length of the heating surface 621 in the X directions.

At step S130, the control unit 500 controls the first electric actuator 410 and the second electric actuator 420 to move the modeling surface 321 of the stage 300 to the second planar position.

At step S135, the control unit 500 controls the third electric actuator 430 to lower the first heating unit 600 and bring the heating surface 621 of the first heating unit 600 and the modeling surface 321 of the modeling stage 320 into contact with each other in the second planar position. Prior to the processing at step S135, the user opens the chuck portions 831 of the three restriction members 830 to set the attitude of the first heating unit 600 to be changeable.

At step S140, similarly to step S110, the attitude of the first heating unit 600 is fixed. Specifically, the user closes the chuck portions 831 of the three regulating members 830 with the heating surface 621 and the modeling surface 321 in contact, and thereby, the respective regulating members 830 grip the movable members 820 to restrict the movement of the respective movable members 820 along the suspension direction and the attitude of the first heating unit 600 is fixed. By the processing at step S140, the attitude of the first heating unit 600 is fixed with the modeling surface 321 and the heating surface 621 in contact with each other in the second planar position determined at step S125.

After the attitude of the first heating unit 600 is fixed at step S140, the above described step S115 and step S120 may be performed again to measure the flatness of the heating surface 621 again and display the measurement result on the display unit 550.

According to the above described first embodiment, in the first planar position, after the attitude of the first heating unit 600 is fixed with the heating surface 621 of the first heating unit 600 and the modeling surface 321 of the stage 300 in contact, the second planar position is determined based on the flatness R of the heating surface 621 measured by the planar sensor 910. Then, in the determined second planar position, the heating surface 621 and the modeling surface 321 are brought into contact with each other again and the attitude of the first heating unit 600 is fixed. Therefore, the flatness of the plate-shaped first heating unit 600 can be adjusted with high accuracy.

Figure 20:
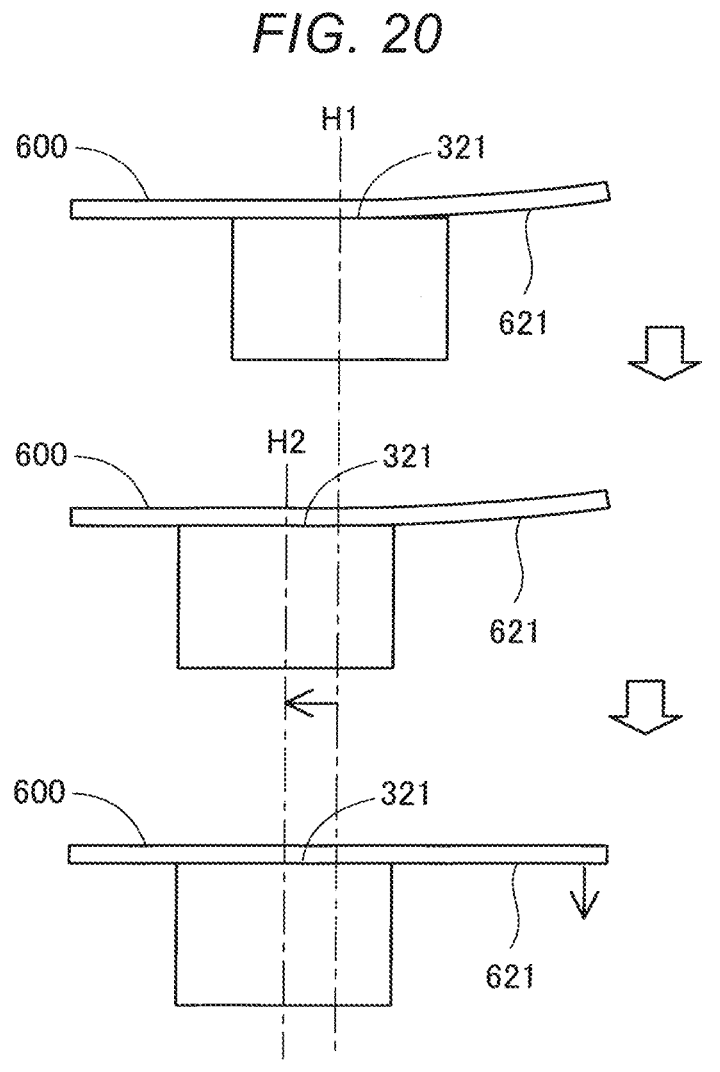

FIG. 20 is a diagram for explanation of effects of the embodiment. As described above, in the embodiment, the second planar position H2 is determined so that the modeling surface 321 moves in the horizontal direction from the first planar position H1 toward the measurement point where the height is the minimum value. The second planar position H2 is determined in the above described manner, and thereby, when upward warpage is produced in the heating surface 621, the warped portion is deformed downward by gravity and the flatness is increased. Therefore, the flatness of the first heating unit 600 can be adjusted with high accuracy. In the embodiment, the attitude of the first heating unit 600 is adjusted in the above described manner, and thereby, variations in heating performance may be suppressed with respect to each three-dimensional modeling apparatus 100.

Further, in the embodiment, the first supporting unit 700 includes the suspending portion 810 that suspends and supports the first heating unit 600 from the supporting member 710 and functions as the attitude changing portion 800. The suspending portion 810 includes the movable member 820 that changes the position of the first heating unit 600 in the suspension direction by moving along the suspension direction with respect to the supporting member 710, and the restriction member 830 that allows and restricts the movement of the movable member 820. The restricting member 830 allows the movement of the movable member 820 to allow a change of the attitude of the first heating unit 600, and restricts the movement of the movable member 820 to fix the attitude of the first heating unit 600. Therefore, in the configuration in which the first heating unit 600 is suspended and supported, the heating surface 621 can be easily set in parallel to the modeling surface 321.

Particularly, in the embodiment, since the restricting member 830 of the suspending portion 810 is formed as a collet chuck, the movable member 820 allowed to move can be more easily moved along the suspension direction. In another embodiment, the restriction member 830 may be formed as, for example, an inner diameter gripping collet chuck, or may be formed by a shaft collar. Even in these cases, as in the embodiment, the movable member 820 allowed to move can be easily moved along the suspension direction.

Further, in the embodiment, the flatness R is measured using the measuring unit 900 including the plate 930 to which the planar sensor 910 is attached and the placement section 940 that places the plate 930 on the stage 300.

Therefore, the measuring unit 900 is placed on the stage 300, and thereby, the flatness R of the heating surface 621 can be easily measured.

Furthermore, in the embodiment, the measuring unit 900 is positioned on the mounting unit 310 by the engagement of the first engagement portion 314 provided on the mounting unit 310 of the stage 300 having the reference surface 313 and the second engagement portion 942 provided on the leg portion 941 of the measuring unit 900. Therefore, the measuring unit 900 can be easily placed in parallel to the modeling surface 321, and the flatness R of the heating surface 621 can be accurately measured.

In addition, in the embodiment, the planar sensor 910 includes at least the first contact sensor 921 and the second contact sensor 922 having different mounting positions to the plate 930. As shown in FIG. 18, the operation of bringing both the first contact sensor 921 and the second contact sensor 922 into contact with the heating surface 621 is performed at a plurality of times in the different planar positions, and in a plurality of contact operations, the first contact sensor 921 and the second contact sensor 922 come into contact with the common measurement point P0. Therefore, using the measurement value at the common measurement point P0 as the reference value, the flatness may be measured in a range larger than the distance between the first contact sensor 921 and the second contact sensor 922. Further, the respective measurement values are indicated by the differences from the reference value, and thereby, an error in attachment height of the respective contact t sensors 920 can be cancelled. Here, the relationship between the first contact sensor 921 and the second contact sensor 922 is described, however, the same applies to the relationship between the second contact sensor 922 and the third contact sensor 923, the relationship between the third contact sensor 923 and the fourth contact sensor 924, and the relationship between the fourth contact sensor 924 and the first contact sensor 921.

Furthermore, in the embodiment, since the value related to the flatness is displayed on the display unit 550, the user can easily check the flatness of the heating surface 621.

Figure 21:
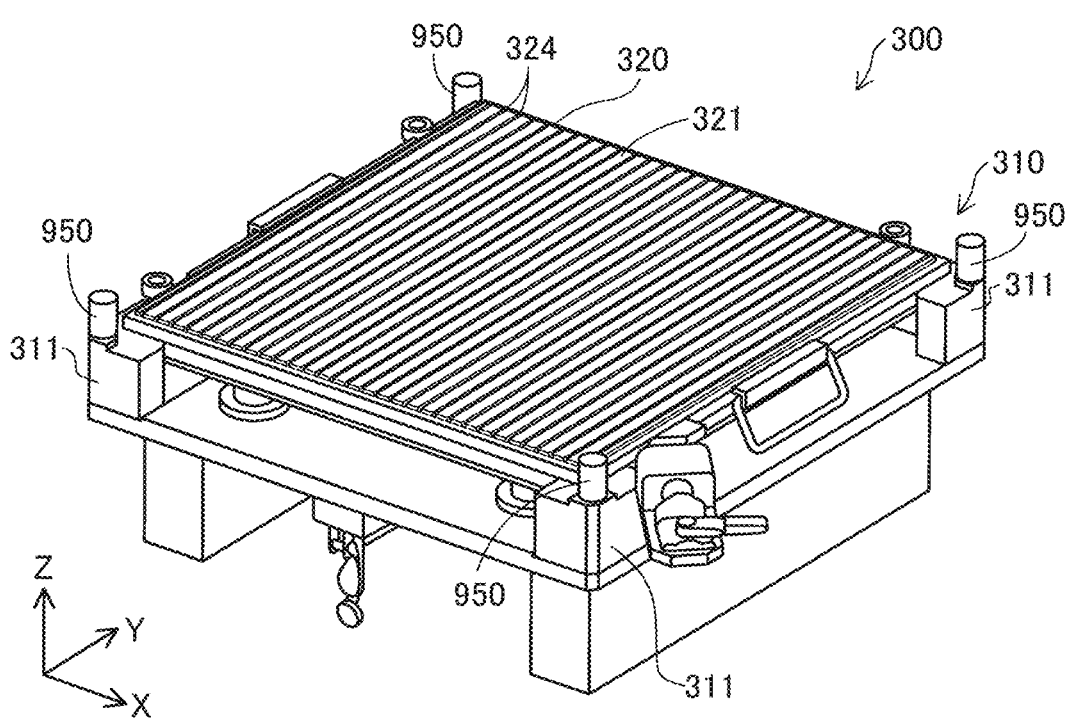
FIG. 21 is a perspective view showing an example of a jig.

B. Other Embodiments (B1) In the above described embodiment, at step S105 and step S135 in FIG. 15, the modeling surface 321 of the stage 300 and the heating surface 621 of the first heating unit 600 are brought into direct contact with each other to fix the attitude of the first heating unit 600. On the other hand, at at least one of step S105 and step S135, as shown in FIG. 21, jigs 950 for pressing the heating surface 621 from above may be placed with respect to the mounting unit 310 of the stage 300, the heating surface 621 may be brought into contact with the jigs 950, and the attitude of the first heating unit 600 may be fixed. In the example shown in FIG. 21, each jig 950 has a columnar shape and has the same length along the Z directions. Each jig 950 is provided in parallel to the modeling surface 321. Note that the jigs 950 may be coupled to each other by coupling members.

(B2) In the above described embodiment, the attachment and detachment of the measuring unit 900 to and from the mounting unit 310 may be performed not by the user, but by the control unit 500 controlling a robot.

(B3) In the above described embodiment, the user opens and closes the chuck portions 831. On the other hand, the chuck portions 831 may be configured to be opened and closed by, for example, air or hydraulic pressure, and may be controlled by the control portion 500.

(B4) In the above described embodiment, the first supporting unit 700 includes the suspending portions 810, but does not necessarily include the suspending portions 810. For example, the first supporting unit 700 may be formed as a supporting unit that supports the first heating unit 600 in the horizontal direction. In this case, the first supporting unit 700 may be configured to change the inclination of the first heating unit 600 in the horizontal direction by pivoting the first heating unit 600, for example. In this case, the attitude changing portion 800 may be formed as, for example, a fixing tool that can allow and restrict the pivot of the first heating unit 600.

(B5) In the above described embodiment, the flatness of the heating surface 621 is measured using the measuring unit 900 including the plate 930 to which the planar sensor 910 is attached and the placement section 940 placing the plate 930 on the stage 300. The measurement of the flatness may be performed, not by the measuring unit 900. For example, the contact sensors 920 forming the planar sensor 910 may be directly placed on the stage 300. Further, the number of contact sensors 920 is not limited to four, but the flatness may be measured using one contact sensor 920. Or, two, three, five, or more contact sensors 920 may be used to measure the flatness.

(B6) In the above described embodiment, the first heating unit 600 is supported by the first supporting unit 700 using the three suspending portions 810. In contrast, the number of the suspending portions 810 is not limited to three, but may be four or more.

(B7) In the above described embodiment, the display unit 550 displays the values related to the flatness. On the other hand, the display of the values related to the flatness on the display unit 550 can be omitted.

(B8) In the above described embodiment, the plasticizing section 30 includes the screw 40 as a flat screw and the barrel 50. In contrast, the plasticizing section 30 does not necessarily include a flat screw. For example, the plasticizing section 30 may include an in-line screw to plasticize the material by rotating the in-line screw to produce the plasticized material. In this case, the barrel is formed in a tubular shape housing the in-line screw, and may be called a cylinder.

(B9) In the above described embodiment, the three-dimensional modeling apparatus 100 includes the two nozzles 61. On the other hand, the number of nozzles 61 may be one, three, or more. The three-dimensional modeling apparatus 100 of the above described embodiment includes two modeling units 200, however, the number of the modeling units 200 may be one, three, or more. One modeling unit 200 may include a plurality of nozzles 61.

(B10) In the above described embodiment, the modeling unit 200 is formed as a head that plasticizes and ejects a material formed in pellets. On the other hand, the modeling unit 200 may be formed as, for example, a head that plasticizes and ejects a filamentary material.

C. Other Aspects

The present disclosure is not limited to the above described embodiments and can be implemented in various configurations without departing from the gist of the present disclosure. For example, technical features of the embodiments corresponding to the technical features in the aspects described as below can be replaced or combined as appropriate in order to solve a part or all of the above described problems or in order to achieve a part or all of the above described effects. Unless the technical features are explained as essential technical features in the specification, the technical features can be deleted as appropriate.

(1) According to a first aspect of the present disclosure, there is provided an attitude adjustment method for adjusting an attitude of a first heating unit in a three-dimensional modeling apparatus including a plasticizing unit producing a plasticized material by plasticizing a material, a nozzle ejecting the plasticized material, a stage having a modeling surface on which the plasticized material is stacked, a moving unit changing a relative position of the nozzle and the stage, the first heating unit in a plate shape having a heating surface heating the plasticized material stacked on the stage and a through hole formed therein, in which at least a part of the nozzle is located at modeling of a three-dimensional modeled object, a first supporting unit configured to change a relative position to the stage together with the nozzle and the first heating unit and placing the first heating unit in a position facing the stage by supporting the first heating unit, and an attitude changing portion configured to fix and change the attitude of the first heating unit. The attitude adjustment method includes (a) fixing the attitude of the first heating unit by the attitude changing portion with the heating surface and the modeling surface or a jig provided in parallel to the modeling surface in contact in a first planar position, (b) measuring flatness of the heating surface by a planar sensor for measuring the flatness of the heating surface, (c) determining a second planar position where the heating surface and the modeling surface or the jig provided in parallel to the modeling surface are brought into contact based on the measured flatness, and (d) bringing the heating surface and the modeling surface or the jig provided in parallel to the modeling surface into contact and fixing the attitude of the first heating unit by the attitude changing portion in the determined second planar position with a change of the attitude by the attitude changing portion allowed.

According to the configuration, in the first planar position, after the heating surface of the first heating unit and the modeling surface or the jig of the stage are brought into contact and the attitude of the first heating unit is fixed, the second planar position is determined based on the flatness of the heating surface measured by the planar sensor, and in the second planar position, the heating surface and the modeling surface or the jig are brought into contact with each other again and the attitude of the first heating unit is fixed. Therefore, the flatness of the plate-shaped heating unit can be adjusted with high accuracy.

(2) In the above described aspect, the first supporting unit may have a supporting member fixed to change a relative position to the stage together with the nozzle, and a suspending portion suspending and supporting the first heating unit from the supporting member and functioning as the attitude changing portion, the suspending portion may have a movable member moving along a suspension direction with respect to the supporting member and changing a position of the first heating unit in the suspension direction, and a restricting member allowing and restricting movement of the movable member, and the restricting member may allow the movement of the movable member to allow the change of the attitude and restrict the movement of the movable member to fix the attitude. According to the configuration, in the configuration in which the first heating unit is suspended and supported, the heating surface can be easily set in parallel to the modeling surface.

(3) In the above described aspect, at the step (b), the flatness may be measured using a measuring unit having a plate to which the planar sensor is attached and a placement section placing the plate on the stage. According to the configuration, the flatness of the heating surface can be easily measured.

(4) In the above described aspect, the three-dimensional modeling apparatus may have a mounting unit having a reference surface with flatness adjusted in advance, the stage may be mounted on the reference surface of the mounting unit, the placement section may have a leg portion, and at the step (b), a first engagement portion provided in the mounting unit and a second engagement portion provided in the leg portion may be engaged with each other, and the measuring unit may be positioned in the mounting unit. According to the configuration, the flatness of the heating surface can be accurately measured.

(5) In the above described aspect, the planar sensor may include at least a first contact sensor and a second contact sensor attached to the plate in different positions, at the step (b), an operation of bringing both the first contact sensor and the second contact sensor into contact with the heating surface may be performed at a plurality of times in different planar positions, and in the operation at the plurality of times, the first contact sensor and the second contact sensor may be brought into contact with a common measurement point. According to the configuration, the flatness may be measured in a range larger than the distance between the first contact sensor and the second contact sensor.

(6) In the above described aspect, (e) displaying a value related to the flatness on a display unit may be provided. According to the configuration, the user can easily check the flatness of the heating surface.

The present disclosure is not limited to the above described aspect of the attitude adjustment method, and can be realized by various aspects such as a three-dimensional modeling system and a method of manufacturing a three-dimensional modeled object.

What is claimed is:

1. An attitude adjustment method for adjusting an attitude of a first heating unit in a three-dimensional modeling apparatus including a plasticizing unit producing a plasticized material by plasticizing a material, a nozzle ejecting the plasticized material, a stage having a modeling surface on which the plasticized material is stacked, a moving unit changing a relative position of the nozzle and the stage, the first heating unit in a plate shape having a heating surface heating the plasticized material stacked on the stage and a through hole formed therein, in which at least a part of the nozzle is located at modeling of a three-dimensional modeled object, a first supporting unit configured to change a relative position to the stage together with the nozzle and the first heating unit and placing the first heating unit in a position facing the stage by supporting the first heating unit, and an attitude changing portion configured to fix and change the attitude of the first heating unit, the method comprising:

(a) fixing the attitude of the first heating unit by the attitude changing portion with the heating surface and the modeling surface or a jig provided in parallel to the modeling surface in contact in a first planar position;

(b) measuring flatness of the heating surface by a planar sensor for measuring the flatness of the heating surface;

(c) determining a second planar position where the heating surface and the modeling surface or the jig provided in parallel to the modeling surface are brought into contact based on the measured flatness; and (d) bringing the heating surface and the modeling surface or the jig provided in parallel to the modeling surface into contact and fixing the attitude of the first heating unit by the attitude changing portion in the determined second planar position with a change of the attitude by the attitude changing portion allowed.

2. The attitude adjustment method according to claim 1, wherein the first supporting unit has a supporting member fixed to change a relative position to the stage together with the nozzle, and a suspending portion suspending and supporting the first heating unit from the supporting member and functioning as the attitude changing portion, the suspending portion has a movable member moving along a suspension direction with respect to the supporting member and changing a position of the first heating unit in the suspension direction, and a restricting member allowing and restricting movement of the movable member, and the restricting member allows the movement of the movable member to allow the change of the attitude and restricts the movement of the movable member to fix the attitude.

3. The attitude adjustment method according to claim 1, wherein at the step (b), the flatness is measured using a measuring unit having a plate to which the planar sensor is attached and a placement section placing the plate on the stage.

4. The attitude adjustment method according to claim 3, wherein the three-dimensional modeling apparatus has a mounting unit having a reference surface with flatness adjusted in advance, the stage is mounted on the reference surface of the mounting unit, the placement section has a leg portion, and at the step (b), a first engagement portion provided in the mounting unit and a second engagement portion provided in the leg portion are engaged with each other, and the measuring unit is positioned in the mounting unit.

5. The attitude adjustment method according to claim 3, wherein the planar sensor includes at least a first contact sensor and a second contact sensor attached to the plate in different positions, at the step (b), an operation of bringing both the first contact sensor and the second contact sensor into contact with the heating surface is performed at a plurality of times in different planar positions, and in the operation at the plurality of times, the first contact sensor and the second contact sensor are brought into contact with a common measurement point.

6. The attitude adjustment method according to claim 1, further comprising (e) displaying a value related to the flatness on a display unit.

* * * * *